US011074673B2

United States Patent
Bar-On et al.

(10) Patent No.: US 11,074,673 B2
(45) Date of Patent: Jul. 27, 2021

(54) MULTI-LEVEL TEMPORAL RESOLUTION INCREASE OF VIDEO

(71) Applicant: NUMERI LTD., Haifa (IL)

(72) Inventors: Ilan Bar-On, Haifa (IL); Oleg Kostenko, Haifa (IL)

(73) Assignee: NUMERI LTD., Haifa (IL)

( * ) Notice: Subject to any disclaimer, the term of this patent is extended or adjusted under 35 U.S.C. 154(b) by 53 days.

(21) Appl. No.: 16/798,527

(22) Filed: Feb. 24, 2020

(65) Prior Publication Data
US 2020/0193565 A1 Jun. 18, 2020

Related U.S. Application Data

(63) Continuation of application No. 16/166,419, filed on Oct. 22, 2018, now Pat. No. 10,733,704, which is a
(Continued)

(51) Int. Cl.
*H04N 7/01* (2006.01)
*G06T 3/40* (2006.01)
(Continued)

(52) U.S. Cl.
CPC .......... *G06T 3/4053* (2013.01); *G06T 3/4076* (2013.01); *H04N 5/21* (2013.01);
(Continued)

(58) Field of Classification Search
CPC ..... G06T 3/4053; G06T 3/4076; H04N 19/44; H04N 5/21; H04N 19/80; H04N 19/33;
(Continued)

(56) References Cited

U.S. PATENT DOCUMENTS

| 5,742,343 A | 4/1998 | Haskell et al. |
| 8,279,341 B1 | 10/2012 | Bozinovic |

(Continued)

FOREIGN PATENT DOCUMENTS

| KR | 20100067029 A | 6/2010 |
| WO | 03055226 A1 | 7/2003 |

(Continued)

OTHER PUBLICATIONS

Shahar, Space-Time Super-Resolution from a Single Video (Year: 2011).*

(Continued)

*Primary Examiner* — Shadan E Haghani
(74) *Attorney, Agent, or Firm* — Manelli Selter PLLC; Edward Stemberger

(57) ABSTRACT

A method of increasing temporal resolution:
a) provides an original video having a given spatial resolution;
b) compresses a first frame of said original video using any image compression method; and
c) repeatedly compresses a next frame of said original video using the steps of:
i. providing a current video comprising the already compressed video frames, said current video having an initial spatial resolution;
ii. repeatedly reducing the spatial resolution of said current video and the spatial resolution of said next frame of the original video, to produce a lowest level spatial resolution current video and a lowest level spatial resolution next frame of the original video; and
iii. compressing said lowest level spatial resolution next frame of the original video to produce a lowest level compressed next frame.

11 Claims, 22 Drawing Sheets

Related U.S. Application Data continuation of application No. 14/899,290, filed as application No. PCT/IB2014/062524 on Jun. 23, 2014, now Pat. No. 10,157,447.

(60) Provisional application No. 61/838,892, filed on Jun. 25, 2013.

(51) Int. Cl.

| | |
|---|---|
| *H04N 19/80* | (2014.01) |
| *H04N 19/33* | (2014.01) |
| *H04N 19/31* | (2014.01) |
| *H04N 19/59* | (2014.01) |
| *H04N 19/44* | (2014.01) |
| *H04N 5/21* | (2006.01) |

(52) U.S. Cl.
CPC ........... *H04N 7/0117* (2013.01); *H04N 19/31* (2014.11); *H04N 19/33* (2014.11); *H04N 19/44* (2014.11); *H04N 19/59* (2014.11); *H04N 19/80* (2014.11)

(58) Field of Classification Search
CPC ...... H04N 19/31; H04N 19/59; H04N 7/0117; H04N 19/103
See application file for complete search history.

(56) References Cited

U.S. PATENT DOCUMENTS

| | | |
|---|---|---|
| 8,331,708 B2 | 12/2012 | Bar-On |
| 2004/0130680 A1 | 7/2004 | Zhou et al. |
| 2009/0244365 A1 | 10/2009 | Takeda et al. |
| 2010/0104210 A1 | 4/2010 | Mallat et al. |
| 2013/0321423 A1 | 12/2013 | Rossato et al. |
| 2013/0322530 A1* | 12/2013 | Rossato ................. H04N 19/62 375/240.12 |
| 2014/0177707 A1 | 6/2014 | Fernandes et al. |

FOREIGN PATENT DOCUMENTS

| | | |
|---|---|---|
| WO | 2008081459 A2 | 7/2008 |
| WO | 2012166512 A2 | 12/2012 |
| WO | 2014053982 A2 | 4/2014 |

OTHER PUBLICATIONS

Santa-Cruz, Opening the laplacian pyramid for video coding, IEEE 2005 (Year: 2005).*

* cited by examiner

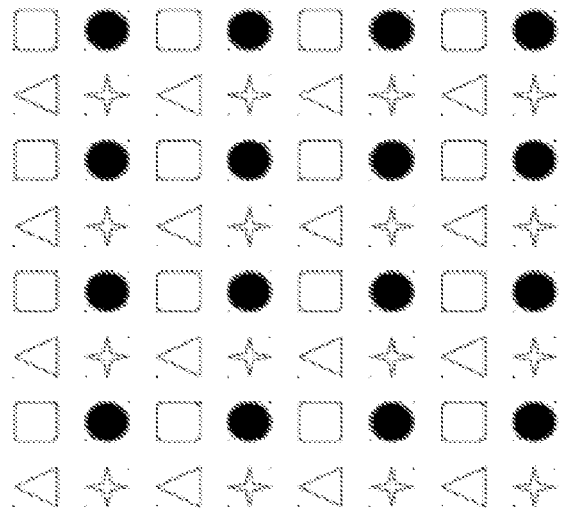
120 Dyadic sub-latices
$$\Lambda_{I_2} = \begin{pmatrix} 2 & 0 \\ 0 & 2 \end{pmatrix}$$
125 A Dyadic dilation matrix
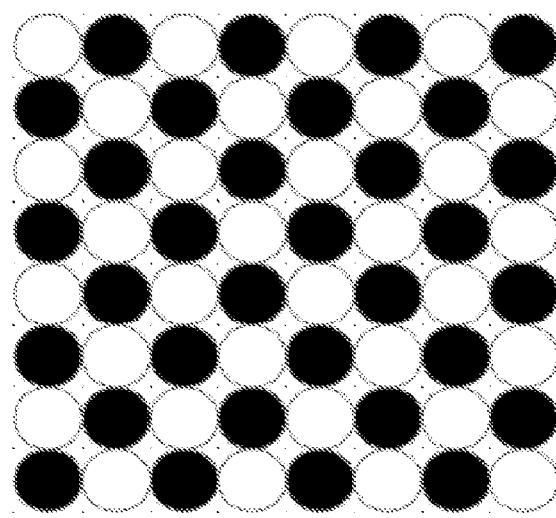
110 Quincunx sub-latices
$$\Lambda_Q = \begin{pmatrix} 1 & -1 \\ 1 & 1 \end{pmatrix}$$
115 A Quincunx dilation matrix
Fig. 1 (Prior Art)

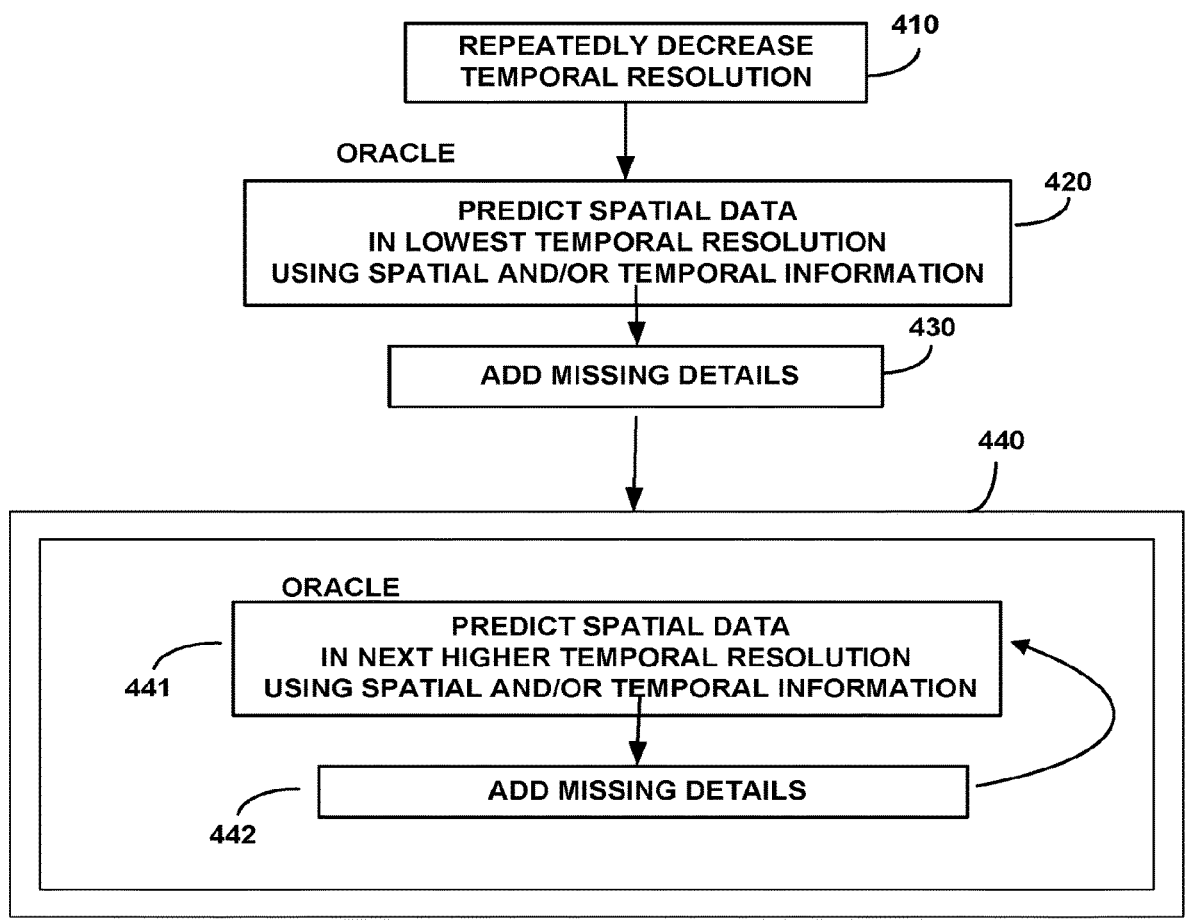
Fig. 4S – SPATIAL RESOLUTION INCREASE OF VIDEO

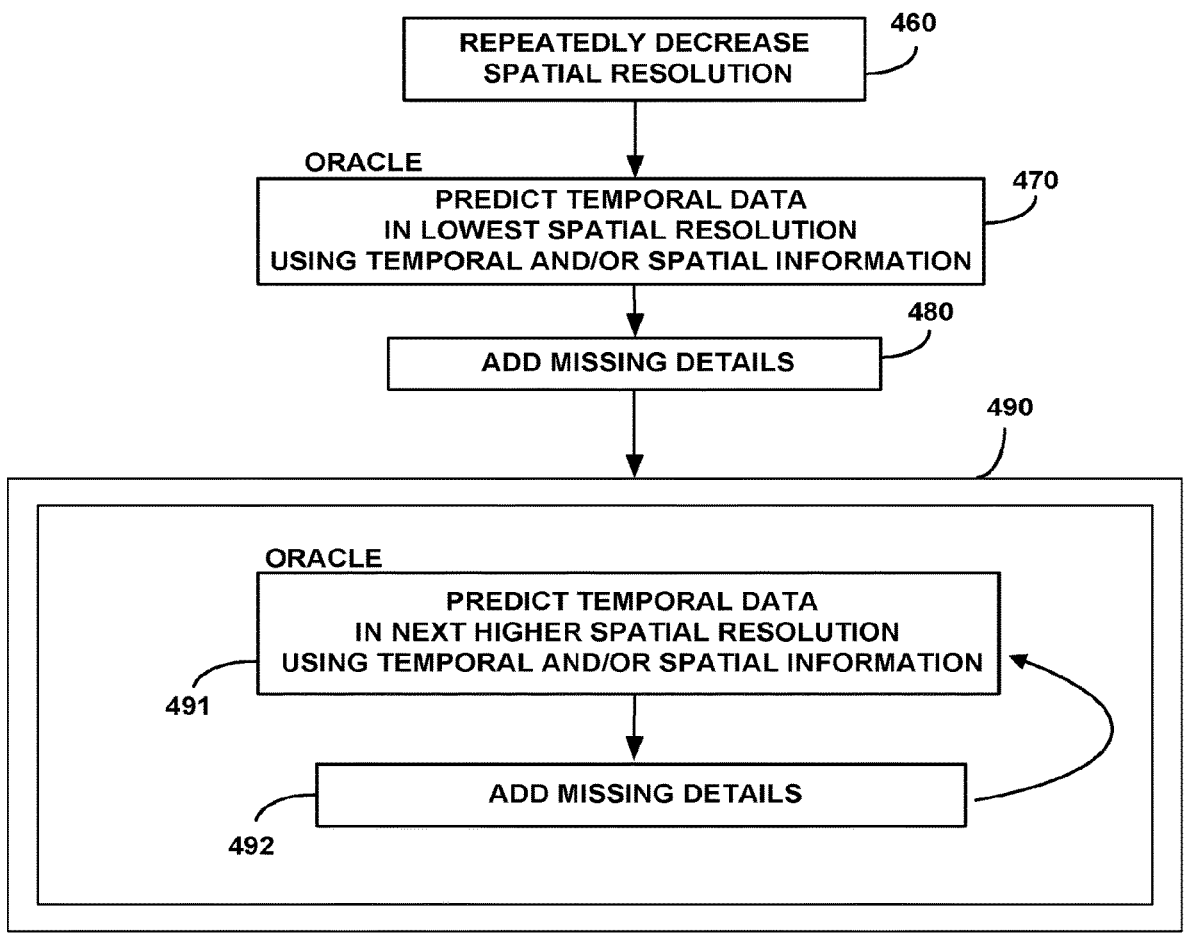
Fig. 4T – TEMPORAL RESOLUTION INCREASE OF VIDEO

500 The Single Image Encoder Raise Algorithm

600 The Single Image Decoder Raise Algorithm

700 A Specific Single Image Encoder Raise Algorithm

800 A Specific Single Image Decoder Raise Algorithm

Let:
$$Y_0^N = [Y_0, \ldots, Y_N]$$

$Y_0 \rightarrow \hat{Y}_0$, see Fig. 5

For $k=1,\ldots,N$,

Let: $\hat{Y}_0^{k-1} = [\hat{Y}_0, \ldots, \hat{Y}_{k-1}]$

Set: $(\hat{Y}_0^{k-1}, Y_k) \rightarrow \hat{Y}_k$, see Fig. 11

900 The No Latency Video Encoder

Fig. 9

$(C'_0, D'_0) \to \hat{Y}_0,$ see Fig 6

For $k = 1, \ldots, N$,

Let: $\hat{Y}_0^{k-1} = [\hat{Y}_0, \ldots, \hat{Y}_{k-1}]$

Set: $(\hat{Y}_0^{k-1}, C'_k, D'_k) \to \hat{Y}_k,$ see Fig. 12

1000 The No Latency Video Decoder

Fig. 10

1100 The No Latency Encoder Raise Algorithm

1200 The No Latency Decoder Raise Algorithm

1300 A Specific No Latency Encoder Raise Algorithm

1400 A Specific No Latency Decoder Raise Algorithm

1500 The Multi-Frame Video Codec

1600 The Multi-Frame Encoder Raise Algorithm

1700 The Multi-Frame Decoder Raise Algorithm

1800 A Specific Temporal Multi-Frame Encoder Raise Algorithm

1900 A Specific Temporal Multi-Frame Decoder Raise Algorithm

2000 A Specific Spatial Multi-Frame Encoder Raise Algorithm

2100 A Specific Spatial Multi-Frame Decoder Raise Algorithm

MULTI-LEVEL TEMPORAL RESOLUTION INCREASE OF VIDEO

CROSS-REFERENCE TO RELATED PATENT APPLICATIONS

This patent application is a continuation of U.S. patent application Ser. No. 16/166,419 filed on 22 Oct. 2018, which is a continuation of U.S. patent application Ser. No. 14/899,290, filed on 17 Dec. 2015, now U.S. Pat. No. 10,157,447, issued on 18 Dec. 2018, which is a U.S. National Phase of PCT Application No. PCT/162014/062524 filed 23 Jun. 2014, which claims priority from and is related to U.S. Provisional Patent Application Ser. No. 61/838,892, filed on Jun. 25, 2013, all listed U.S. patent applications being incorporated by reference in their entirety herein.

The present invention is in the field of image and video processing.

BACKGROUND

Raw video files are huge. For example, an Ultra High Definition (UHD) movie with 120 frames per second (fps), 3840×2160 pixels per frame, 3 colors per pixel, and 16 bits per color, requires bandwidth of:

3840*2160*120*3*16=47,775,744,000 Bits per sec*50 Giga bits per sec, equivalent to about 500 high speed (100 Mbps) fiber channels.

If the movie last for two hours, as usual, it requires storage of:

47,775,744,000*7,200≈343,985 Giga bits≈45 Tera bytes, equivalent to about 5,000 regular(5 Gbytes) DVD disks.

Video compression,

"The art of reducing the video size without affecting its visual quality", is therefore a necessary tool for any applications that deals with video. In general, a video consists of several components, such as in the RGB color space or in the YUV color space. However, without loss of generality we consider here only one such component. The generalization to a whole video is discussed in Pat [1].

The lattice of integers, $Z^n$, is the set of n tuples of integers in the real Euclidean space of $R^n$. A frame can be viewed as a rectangular grid on the lattice $Z^2$, and a video as a cubic grid on $Z^3$. A subset of a lattice, which is itself a lattice, is called a sub-lattice, see Ref [1]. Examples of sub-lattices of $Z^2$ are given in FIG. 1. The two Quincunx sub-lattices are given in unit 110. The white circled points constitute the even sub-lattice and the dark circled points the odd sub-lattice. The four Dyadic sub-lattices are similarly given in unit 120. A dilation matrix is associated with the sub-lattices, see unit 115 for the Quincunx case and unit 125 for the Dyadic case. Note further that the number of possible sub-lattices is determined by the determinant of the corresponding dilation matrix.

Down-sampling refers to the process of extracting a sub-lattice from a given lattice. For example, we show Dyadic down sampling in FIG. 2. The input signal is shown in unit 210. A temporal down sampling is shown in unit 220, and a spatial down sampling in unit 230. A combined temporal and spatial down sampling is shown in unit 240.

A Generic Video Codec, as depicted in FIG. 3, consists of the following:
1. The Encoder:
   The input video is denoted by Y, and the output encoded video by Y'.
2. The Bit Stream:
   The Bit Stream is the encoded video Y'.
   Depending on the application, it is either transmitted or stored on disk.
3. The Decoder:
   The input to the Decoder is the Bit Stream, and the output decoded video is denoted by $\hat{Y}$.

See Pat [1] for more details.

SUMMARY

According to an aspect of an embodiment, a method of video compression includes: a) providing an original video having a given spatial resolution; b) compressing a first frame of the original video using any image compression method; and c) repeatedly compressing a next frame of the original video using the steps of: i) providing a current video comprising the already compressed video frames, the current video having an initial spatial resolution; ii) repeatedly reducing the spatial resolution of the current video and the spatial resolution of the next frame of the original video, to produce a lowest level spatial resolution current video and a lowest level spatial resolution next frame of the original video; iii) compressing said lowest level spatial resolution next frame of the original video to produce a lowest level compressed next frame, using the steps of: 1) Oracle prediction of the lowest level spatial resolution next frame of the original video, using temporal and/or spatial information of the lowest level spatial resolution current video and the next frame; and 2) calculating enhancement data and using the calculated enhancement data to enhance the prediction. The method further includes iv) compressing a higher-level spatial resolution of said next frame of the original video frame to produce a higher-level compressed next frame, using the steps of: 3) Oracle prediction of said higher level spatial resolution next frame of the original video, using temporal and/or spatial information of said higher-level spatial resolution current video and said lower-level compressed next frame; and 4) calculating enhancement data and using said calculated enhancement data to enhance said prediction. Step iv) is repeated up to the initial spatial resolution of said current video.

BRIEF DESCRIPTION OF THE DRAWINGS

FIG. 1 depicts Quincunx and Dyadic sub-lattices and dilation matrices;

FIG. 4S is a diagram of the spatial resolution increase of the video;

FIG. 4T is a diagram of the temporal resolution increase of the video;

FIG. 9 is a diagram of the No Latency Video Encoder;

FIG. 10 is a diagram of the No Latency Video Decoder;

DETAILED DESCRIPTION OF THE INVENTION

Figure 2:
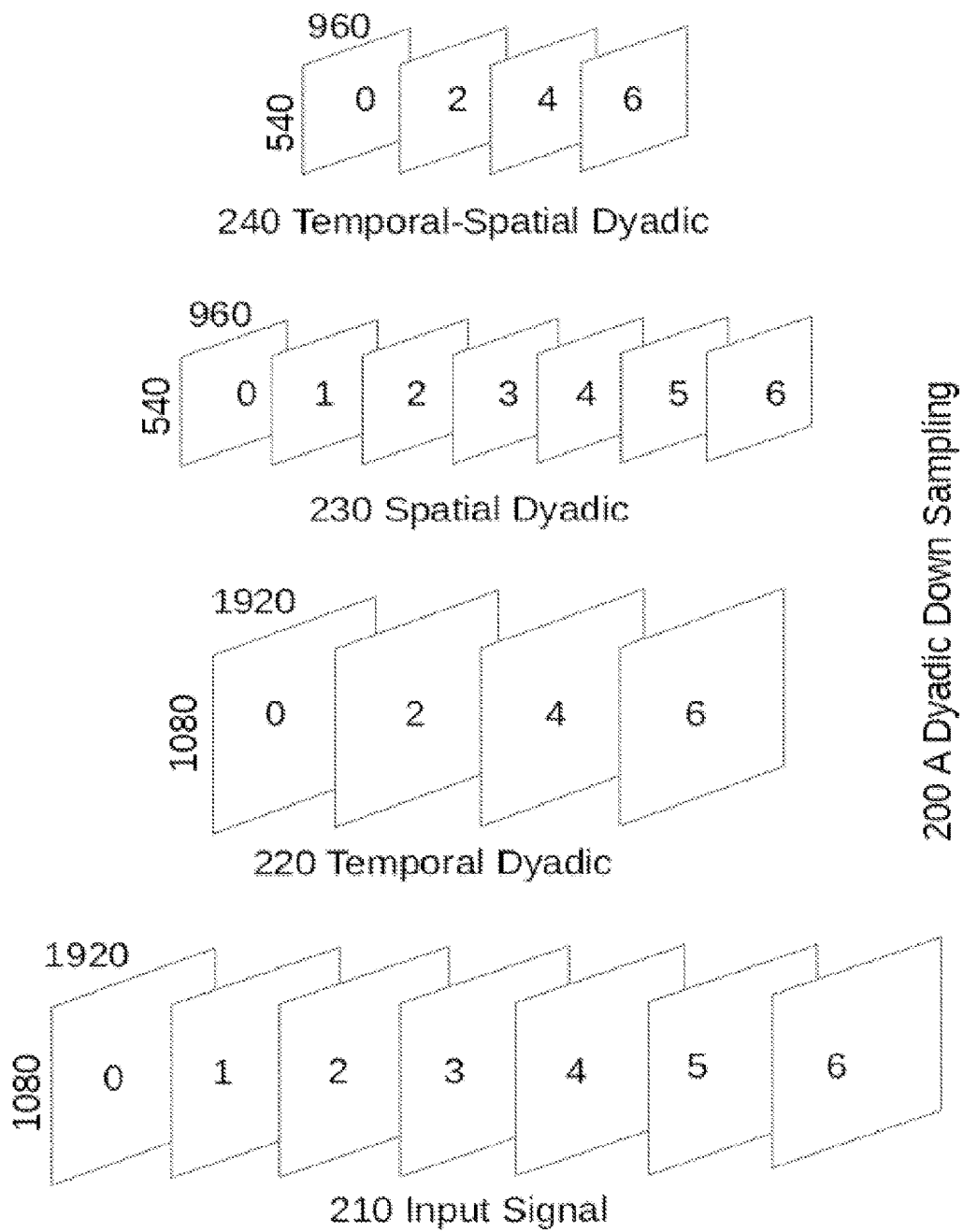
FIG. 2 depicts Dyadic down samplings.
Figure 3:
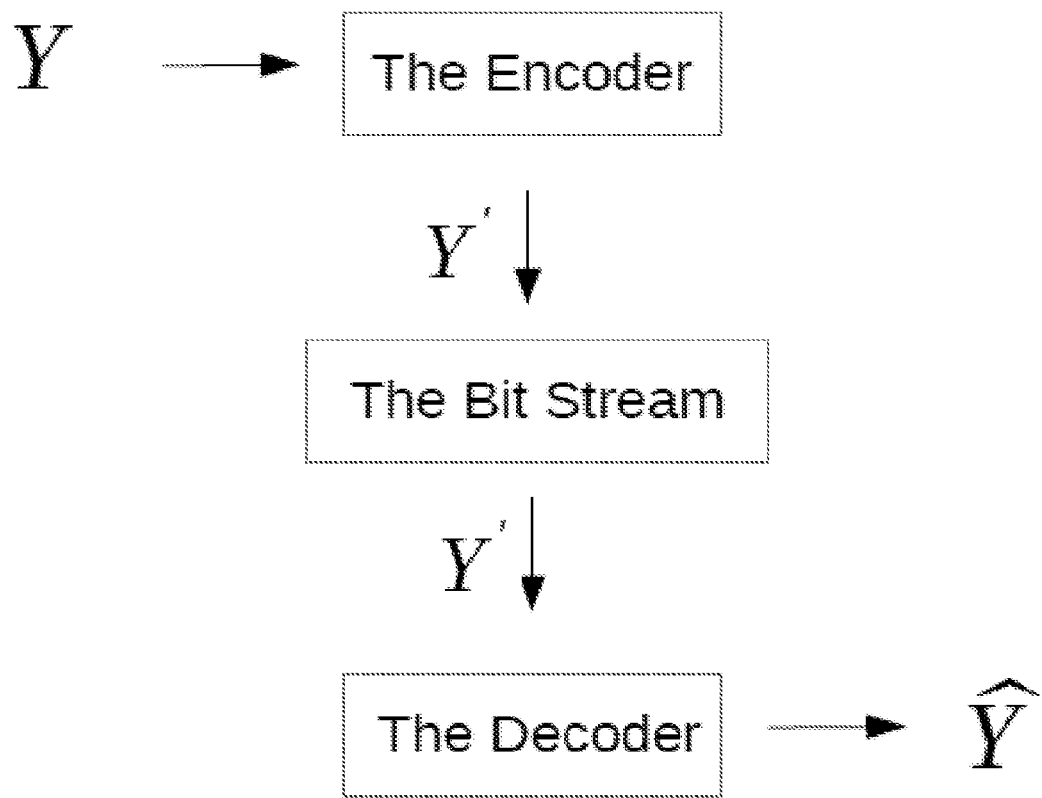
FIG. 3 is a diagram of a Generic Video Codec.

The present invention provides a new algorithm for the Raise operation as described in Pat [1], namely, the respective one stage of the spatial-temporal resolution increase of the video. The Raise operation is performed at both the Encoder and Decoder. The Encoder simulates the Raise operation of the Decoder and sends additional details if needed.

The new Raise algorithm gives rise to new image and video compression codecs with many fundamental advantages over the current state of the art image and video codecs. Namely:

1. The Decoder performs the Oracle operation of the Raise algorithm without the need for supplementary information such as motion vectors.
2. Because there is no need to receive supplementary information from the Encoder, the compression factors improve significantly.
3. The Codec can work on the pixel level, so as to achieve the best compression results. In contrast, mpeg is forced to use varying block size.
4. Because we work on the pixel level, we do not get the annoying blocking artifacts that are common to the mpeg standard.
5. The Decoder can use more advanced methods such as optical flows to detect complex motions such as zoom and rotation. In contrast, mpeg uses block matching algorithm that only detect translations.
6. The Decoder can also use more advanced spatial prediction methods, such as edge detection methods. This is not possible with mpeg.
7. The Codec can use SIMD (single instruction multiple data) processing hardware such as GPUs to accelerate the computation as opposed to mpeg where SIMD is nearly impossible.
8. Because we can use SIMD hardware we can design better compression algorithms, trading processing power for compression factors. This is not possible with mpeg, where the need to send supplementary information rules out any real improvement in compression.

FIG. 4S is a flowchart of the Raise algorithm for the spatial resolution increase of the video. In step 410, the initial temporal resolution of the video is repeatedly decreased, until we reach some given lowest temporal resolution video. In step 420, the spatial resolution of this given lowest temporal resolution video is then increased using an Oracle algorithm. In the Oracle algorithm we first analyze the lowest temporal resolution video both temporally and spatially. In terms of the temporal analysis we compute the temporal motion field of the would-be increased spatial resolution video. Similarly, in terms of the spatial analysis, we compute the spatial geometrical structure of the would-be increased spatial resolution video. Finally, we predict the increased spatial resolution video using that spatial and/or temporal information. We stress that the Oracle algorithm reconstructs the higher spatial resolution video of the given lowest temporal resolution video, without receiving any supplementary information from the Encoder. Once this is done, the Encoder may decide that some additional details should be sent to the Decoder in order to enhance the quality of the predicted increased spatial resolution video. In step 430, these missing details are then added to the reconstructed video. In step 440, the opposite operation to step 410 is performed. Namely, the temporal resolution of the video is repeatedly increased. This is done using the following sub-steps:

In sub-step 441 the spatial resolution of the next higher temporal resolution video is increased using an Oracle algorithm as discussed in Step 420. Here, we stress again that the Oracle algorithm prediction is performed without receiving any supplementary information from the Encoder.

Once this is done, the Encoder may decide that some additional details should be sent to the Decoder in order to enhance the quality of that predicted increased spatial resolution video. In sub-step 442, these missing details are then added to the reconstructed higher spatial resolution video.

The above two sub-steps are repeatedly performed until we reach the initial temporal resolution of step 410. Note, however, that by this time, the spatial resolution of the whole video has been increased.

The Raise algorithm for the temporal resolution increase is very similar. We only have to interchange the terms spatial and temporal in FIG. 4S to get FIG. 4T. Here, in step 460, the initial spatial resolution of the video is repeatedly decreased, until we reach some given lowest spatial resolution video. In step 470, the temporal resolution of the given lowest spatial resolution video is increased. As above, in the Oracle algorithm we first analyze the lowest spatial resolution video both temporally and spatially. In terms of the temporal analysis we compute the temporal motion field of the would-be increased temporal resolution video. Similarly, in terms of the spatial analysis, we compute the spatial geometrical structure of the would-be increased temporal resolution video. Finally, we predict the increased temporal resolution video using that temporal and/or spatial information. We stress again that that prediction is done without receiving any supplementary information from the Encoder. The Encoder may then decide that some additional details should be sent to the Decoder in order to enhance the quality of the predicted increased temporal resolution video. In step 480, these missing details are then added to the reconstructed video. In step 490, the opposite operation to step 460 is performed. Namely, the spatial resolution of the video is repeatedly increased, using the following sub-steps:

In sub-step 491, the temporal resolution of the next higher spatial resolution video, is increased using an Oracle algorithm as discussed in Step 470. Here, we stress again that the Oracle algorithm prediction is performed without receiving any supplementary information from the Encoder.

Once this is done, the Encoder may decide that some additional details should be sent to the Decoder in order to enhance the quality of that predicted increased temporal resolution video. In sub-step 492, these missing details are then added to the reconstructed higher temporal resolution video.

The above two sub-steps are repeatedly performed until we reach the initial spatial resolution of step 460. As above, by this time, the temporal resolution of the whole video has been increased.

The present invention is also useful in many other image and video applications such as super-resolution, image matting and compositing, hole filling, image stitching, 3D reconstruction, in-painting, recognition, and more, see Ref [4]. For example, if we omit step 430 and sub-step 442 from FIG. 4S, we get an algorithm for the spatial super resolution increase of videos. Similarly, if we omit step 480 and sub-step 492 from FIG. 4T, we get an algorithm for the temporal super resolution increase of videos.

In what follows, we proceed to describe the new Raise algorithm in terms of the following use cases: single image compression, no latency video compression, and multi frame video compression.

USE CASE: THE SINGLE IMAGE CODEC

Figure 5:
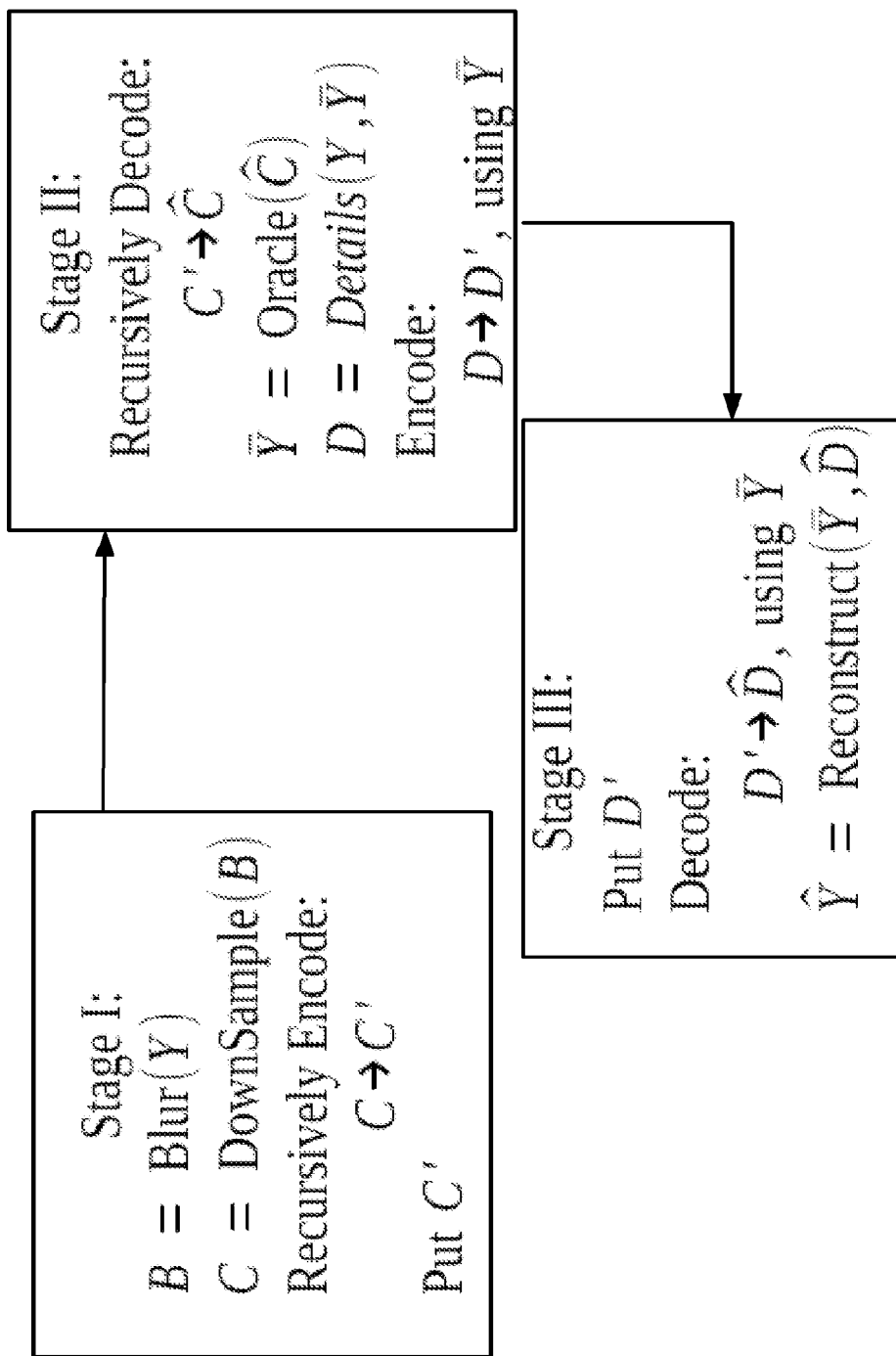
FIG. 5 is a diagram of the Single Image Encoder Raise Algorithm.
Figure 6:
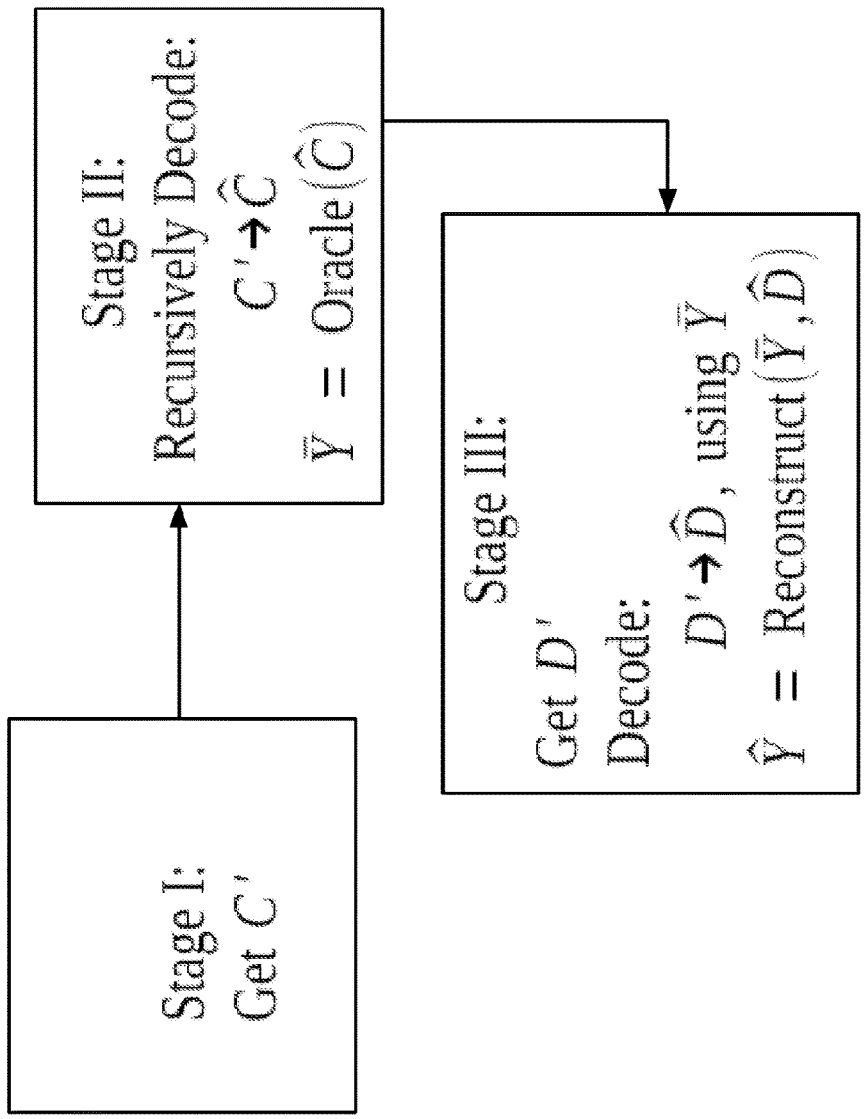
FIG. 6 is a diagram of the Single Image Decoder Raise Algorithm.

The present invention also applies to the compression of single images, where the Raise algorithm may be viewed as the temporal resolution increase of a video with no frames. The Raise algorithm is depicted in FIG. 5 and FIG. 6. After reviewing the main stages we proceed to describe a specific Raise implementation.

The Single Image Encoder Raise Algorithm (FIG. 5)

Stage I

Step 1: Let Y be the input image. Then apply a two-dimensional blur filter to Y and denote the resulting blurred image as B.

Step 2: Down sample B, and denote the resulting down sampled sub-image as C. For example, down sample by the Quincunx method as depicted in FIG. 1, unit 110.

Step 3: Recursively encode C into c' using the current Single Image Encoder Raise algorithm applied to the blurred and down sampled sub-image C. At the lowest level, we reach a sub-image X of lowest resolution. We then encode X using existing image compression methods such as the ones described in Ref [2]. The lowest level by which we end the recursion can be determined in advance or dynamically using rate distortion techniques such as described in Ref [3].

Step 4: Put the encoded data C' on the Bit Stream.

Stage II

Step 1: Recursively decode C' into $\hat{C}$, see Step 3 of Stage I above.

Step 2: Predict the original image Y from $\hat{C}$, using an Oracle method, and denote the result as $\overline{Y}$. For the Oracle method see the detailed description of the invention above.

Step 3: Decide on the additional details D needed for recovering a good presentation of the original image. For example, the details can be the difference between the original image Y and the predicted one $\overline{Y}$.

Step 4: Encode the details D using $\overline{Y}$, and denote the result as D'. Here again we use existing two-dimensional compression methods, see Ref [2], Pat [2], and Pat [3].

Stage III

Step 1: Put the encoded details D' on the Bit Stream.

Step 2: Decode $\hat{D}$ from D' using $\overline{Y}$, see Step 4, Stage II above.

Step 3: Reconstruct $\hat{Y}$ from $\overline{Y}$, and $\hat{D}$. For example, if the details were the difference as in Step 3 of Stage II above, then we reconstruct by adding $\hat{D}$ to $\overline{Y}$.

The Single Image Bit Stream

The Bit Stream consists of the encoded sub-image C', and the details D'. Since C' is recursively computed, C' itself consists of a very low resolution encoded sub-image and the sequence of the corresponding details.

The Single Image Decoder Raise Algorithm (FIG. 6)

Stage I

Step 1: Get C' from the Bit Stream.

Stage II

Step 1: Recursively decode C' into $\hat{C}$, see Step 1 of Stage II of the Encoder above.

Step 2: Predict the original image Y from $\hat{C}$, using an Oracle method, and denote the result as $\overline{Y}$. Note that this is the same Oracle method as in Step 2 of Stage II of the Encoder above.

Stage III

Step 1: Get D' from the Bit Stream.

Step 2: Decode $\hat{D}$ from D' using $\overline{Y}$.

Step 3: Reconstruct the decoded image $\hat{Y}$ from $\overline{Y}$, and $\hat{D}$.

Figure 7:
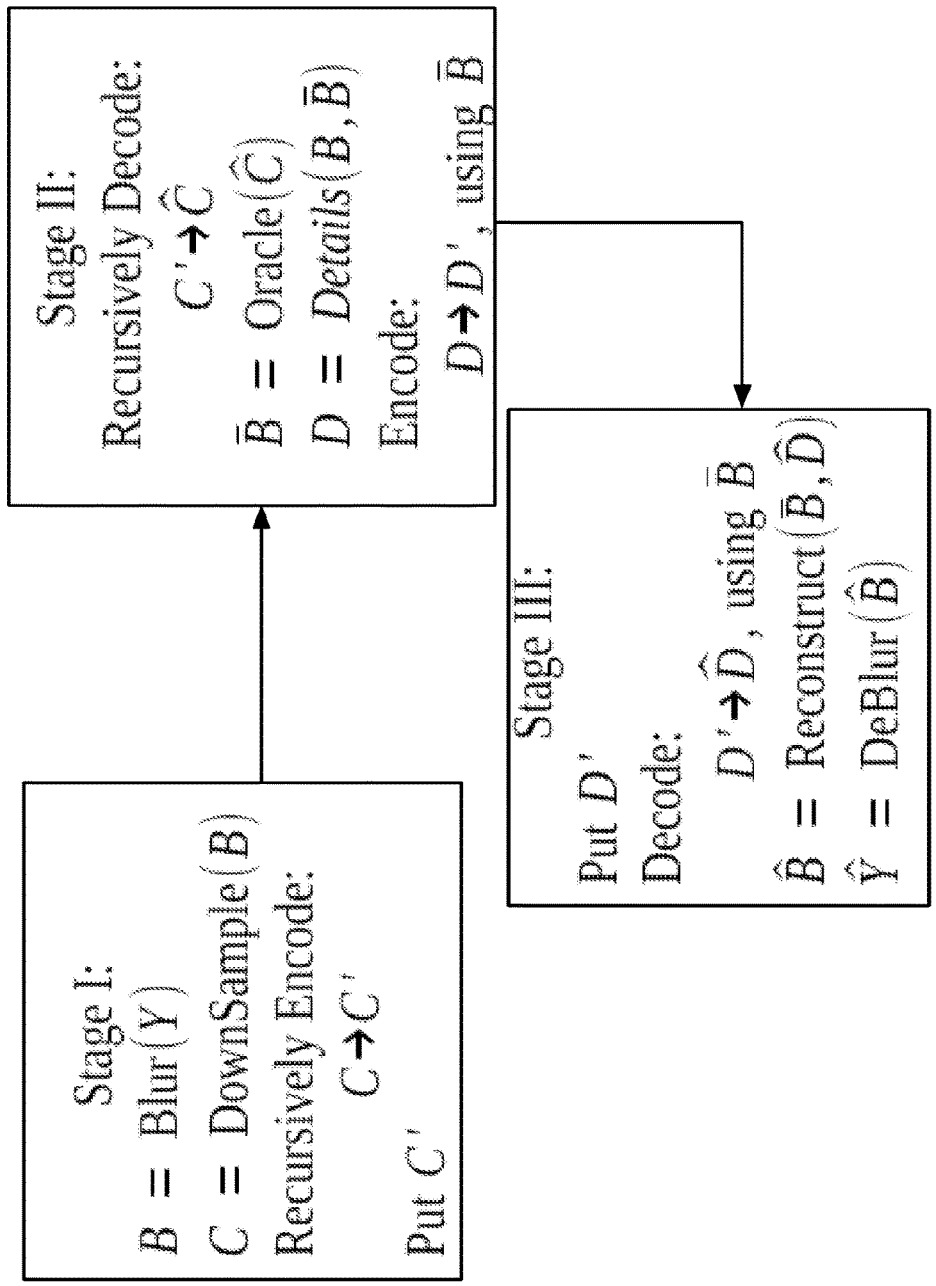
FIG. 7 is a diagram of a Specific Single Image Encoder Raise Algorithm.
Figure 8:
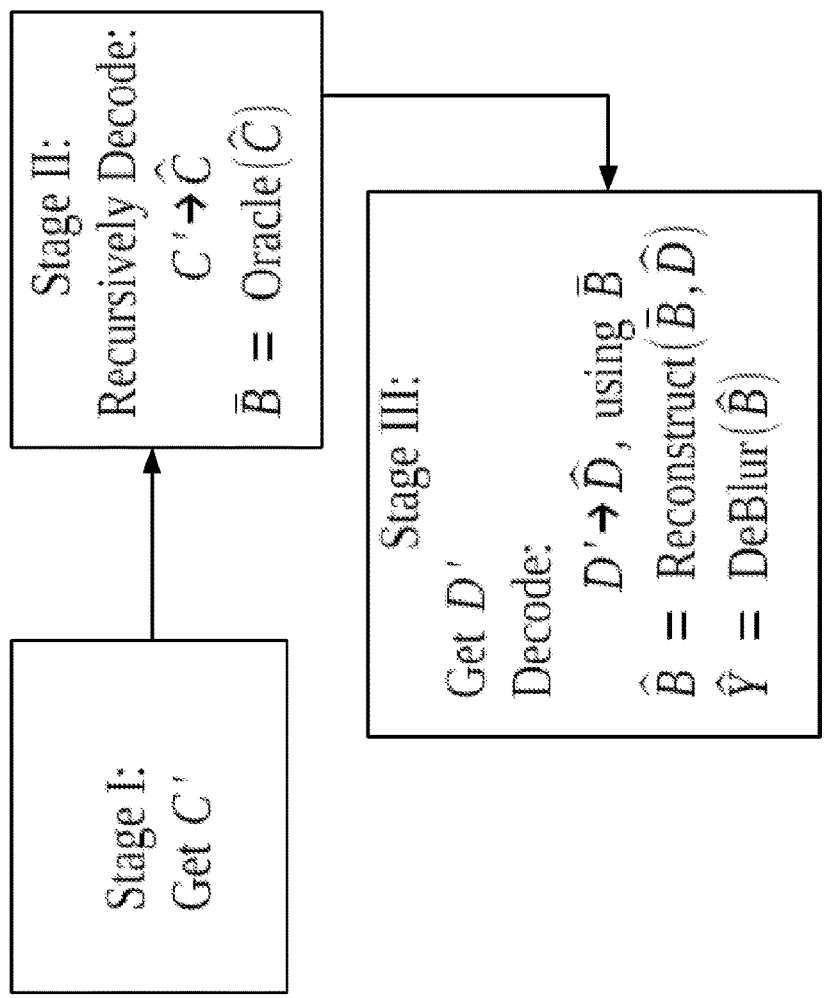
FIG. 8 is a diagram of a Specific Single Image Decoder Raise Algorithm.

Example 1: A Specific Single Image Raise Algorithm (FIGS. 7, 8)

In this section we describe one possible implementation of the single image Raise algorithm above. Note however, that many other Encoder/Decoder implementations are possible. In our example, the Oracle predicts an image $\overline{B}$ which is the completion of the sub-image $\hat{C}$ to the spatial resolution of the whole image B. More precisely, the pixels in $\overline{B}$ that correspond to the down sampled sub-image $\hat{C}$, are exactly those of $\hat{C}$. Then, the other pixels in $\overline{B}$ are predicted from those of $\hat{C}$. For example, consider the case of the Quincunx down sampling method, where we assume that $\hat{C}$ corresponds to the even sub-lattice. Then, the even sub-lattice of $\overline{B}$ is determined by $\hat{C}$, and the odd sub-lattice is predicted from this. Many image processing tools, such as edge detection methods can be used for this purpose, see for example Ref [4] and Ref [5].

To complete the description of the algorithm, we note that we determine the details D from B and $\overline{B}$, and reconstruct $\hat{B}$ from $\hat{D}$ and $\overline{B}$. We finally recover the original image $\hat{Y}$ by de-blurring the decoded blurred image $\hat{B}$.

Use Case: THE NO LATENCY VIDEO CODEC

In the no latency video codec, the video frames are processed one after the other. Namely, at each step we compress the next coming frame given the already compressed video frames. The Raise algorithm in this case amounts to the temporal resolution increase of a video with an additional last frame. The no latency video codec is essential for time-critical applications such as video conferencing and videophone where latency is the most crucial aspect of the system.

The no latency video compression algorithm consists of the following steps:

1. We denote the input video frames as: $Y=[Y_0, \ldots, Y_N]$.
2. We start by Encoding/Decoding the first frame $Y_0$, using for example the image compression algorithm of the previous section.
3. We denote the decoded first frame by $\hat{Y}_0$.

We now assume by induction that we have already compressed the first $k \geq 1$ frames.

4. Let us denote the first k already decoded frames as:

$$\hat{Y}_0^{k-1}=[\hat{Y}_0, \ldots, \hat{Y}_{k-1}], k=1, \ldots, N.$$

5. Then, we proceed to Encode/Decode $Y_k$ using $\hat{Y}_0^{k-1}$, namely, the previously decoded frames.
6. We denote the resulting new decoded frame as $\hat{Y}_k$.

We apply steps 4-6 above, iteratively, N times, for $k=1, \ldots, N$.

The No Latency Video Encoder is depicted in FIG. 9 and the corresponding No Latency Video Decoder is depicted in FIG. 10.

Next, we review the main stages of the no latency Raise algorithm, and proceed to describe a specific no latency Raise implementation.

The No Latency Encoder Raise Algorithm

Figure 11:
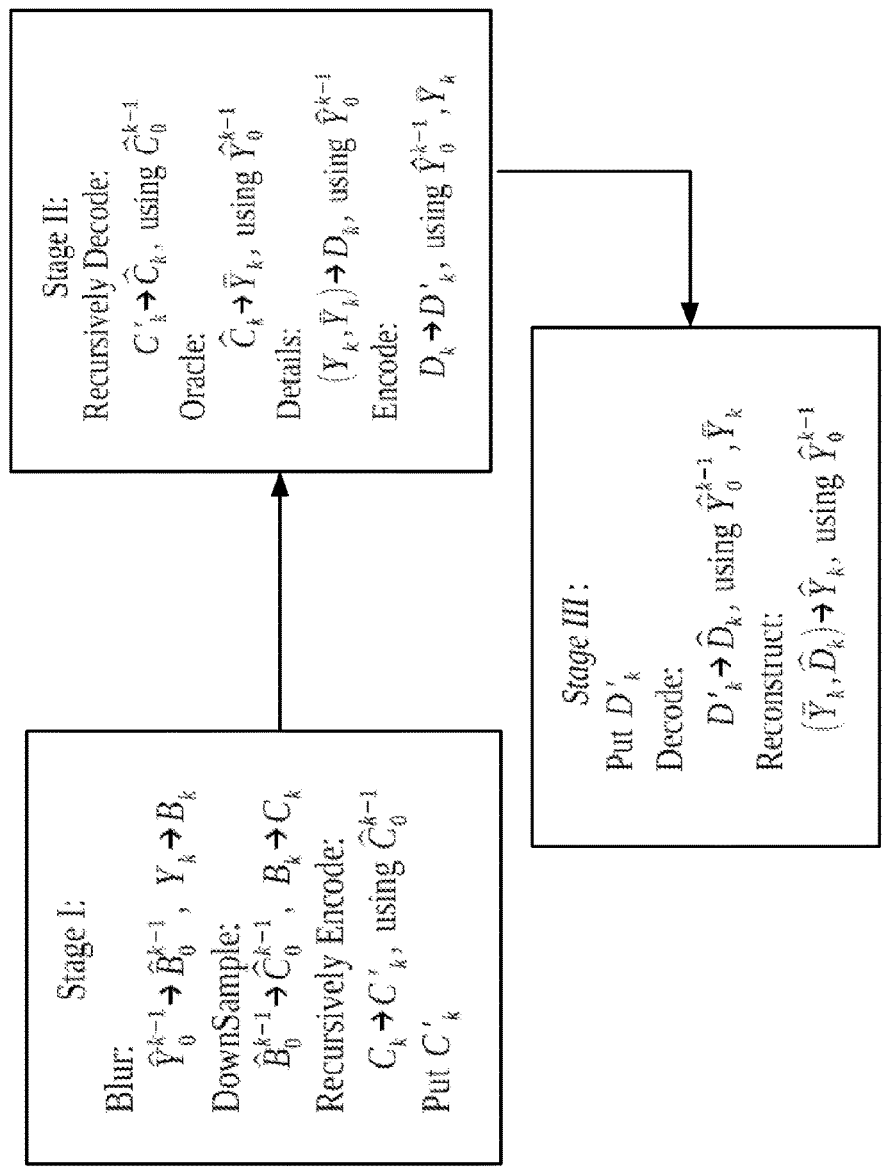
FIG. 11 is a diagram of the No Latency Encoder Raise Algorithm.

Iteration $k=1, \ldots, N$ (FIG. 11)

Stage I

Step 1: Let $Y_k$ denote the input frame, and let $\hat{Y}_0^{k-1}$ denote the first k so far decoded frames. Then, apply two-dimensional blur filters to frame $Y_k$, and to frames in $\hat{Y}_0^{k-1}$. Denote the respective resulting blurred frames by $B_k$ and $\hat{B}_0^{k-1}$.

Step 2: Down sample $B_k$ and denote the resulting down sampled frame as $C_k$. Similarly, down sample each frame in $\hat{B}_0^{k-1}$ and denote the resulting down sampled frames as $\hat{C}_0^{k-1}$. For example, see the Quincunx method of FIG. 1, unit 110.

Step 3: We apply the current No Latency Encoder Raise algorithm recursively to the blurred and down sampled sub-frame $C_k$ using the blurred and down sampled decoded sub-frames $\hat{C}_0^{k-1}$, and denote the result as $C'_k$. At the lowest level, we reach a sub-frame $X_k$ and decoded sub-frames $\hat{X}_0^{k-1}$ of lowest resolution. We then encode $X_k$ using existing image compression methods such as described in Ref [2]. Alternatively, we can apply the following algorithm:

Predict $X_k$ from $\hat{X}_0^{k-1}$ and denote the predicted frame by $\overline{X}_k$. This can be done using known frame extrapolation methods, see for example Ref [4].

Determine the additional details $\tilde{X}_k$ needed to recover $X_k$. For example this could be the difference $\tilde{X}_k = X_k - \overline{X}_k$.

Encode $\tilde{X}_k$ using existing two-dimensional methods, see Ref [2] and Pat [3]. We denote the resulting encoded data by $\tilde{X}'_k$.

The lowest level by which we end the recursion can be determined in advance or dynamically using rate distortion techniques such as described in Ref [3].

Step 4: Put the encoded $C'_k$ on the Bit Stream.

Stage II

Step 1: Recursively decode $C'_k$ into $\hat{C}_k$ using $\hat{C}_0^{k-1}$, see Step 3 of Stage I above.

Step 2: Predict the original frame $Y_k$ from $\hat{C}_k$ and $\hat{Y}_0^{k-1}$, using an Oracle method, and denote the resulting frame as $\overline{Y}_k$. For the Oracle method, see the detailed description of the invention above.

Step 3: Decide on the additional details $D_k$ needed for recovering a good presentation of the original frame from $Y_k$ and $\overline{Y}_k$ using $\hat{Y}_0^{k-1}$. For example, the details can be the difference between the original frame and the predicted one $\overline{Y}_k$.

Step 4: Encode the details $D_k$ using $\hat{Y}_0^{k-1}$ and $\overline{Y}_k$ and denote the result by $D'_k$.

Here again we use existing two-dimensional compression methods, see Ref [2], Pat [2], and Pat [3].

Stage III

Step 1: Put the encoded data $D'_k$ on the Bit Stream.
Step 2: Decode $\hat{D}_k$ from $D'_k$, using $\hat{Y}_0^{k-1}$ and $\overline{Y}_k$, see Step 4, Stage II above.
Step 3: Reconstruct $\hat{Y}_k$ from $\overline{Y}_k$, and $\hat{D}_k$ using $\hat{Y}_0^{k-1}$. For example, if the details were the difference as in Step 3 of Stage II above, then we reconstruct by adding $\hat{D}_k$ to $\overline{Y}_k$.

The No Latency Video Bit Stream

Iteration $k=1, \ldots, N$

The Bit Stream consists of the encoded sub-frame $C'_k$, and the details $D'_k$. Since $C'_k$ is recursively computed, $C'_k$ itself consists of a very low resolution encoded sub-frame and the sequence of the corresponding details.

The No Latency Decoder Raise Algorithm

Figure 12:
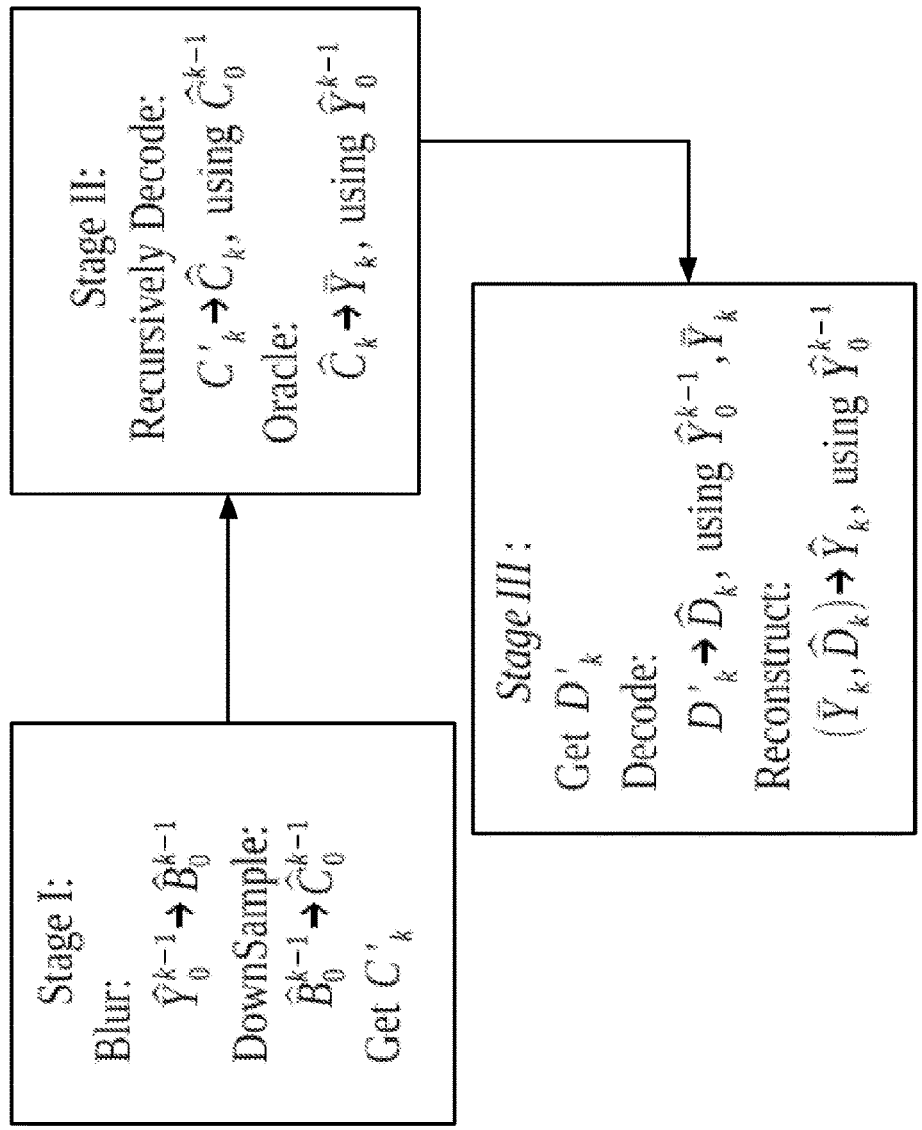
FIG. 12 is a diagram of the No Latency Decoder Raise Algorithm.

Iteration $k=1, \ldots, N$
(FIG. 12)

Stage I

Step 1: Apply the same two-dimensional blur filters, as in Step 1 of Stage I of the Encoder to the frames in $\overline{Y}_0^{k-1}$. Denote the resulting blurred frames as $\hat{B}_0^{k-1}$.

Step 2: Down sample each frame in $\hat{B}_0^{k-1}$, as in Step 2 of Stage I of the Encoder.

Denote the resulting down sampled frames as $\hat{C}_0^{k-1}$.

Step 3: Get the encoded data $C'_k$ from the Bit Stream.

Stage II

Step 1: Recursively decode $C'_k$ into $\hat{C}_k$ using $\hat{C}_0^{k-1}$.
Step 2: Predict the original frame $Y_k$ from $\hat{C}_k$ and $\hat{Y}_0^{k-1}$, using an Oracle method, and denote the resulting frame as $\overline{Y}_k$. Note that this is the same Oracle method as in Step 2 of Stage II of the Encoder above.

Stage III

Step 1: Get the encoded details $D'_k$ from the Bit Stream.
Step 2: Decode $\hat{D}_k$ from $D'_k$, using $\hat{Y}_0^{k-1}$ and $\overline{Y}_k$.

Step 3: Reconstruct the decoded frame $\hat{Y}_k$ from $\overline{Y}_k$, and $\hat{D}_k$ and using $\hat{Y}_0^{k-1}$.

Figure 13:
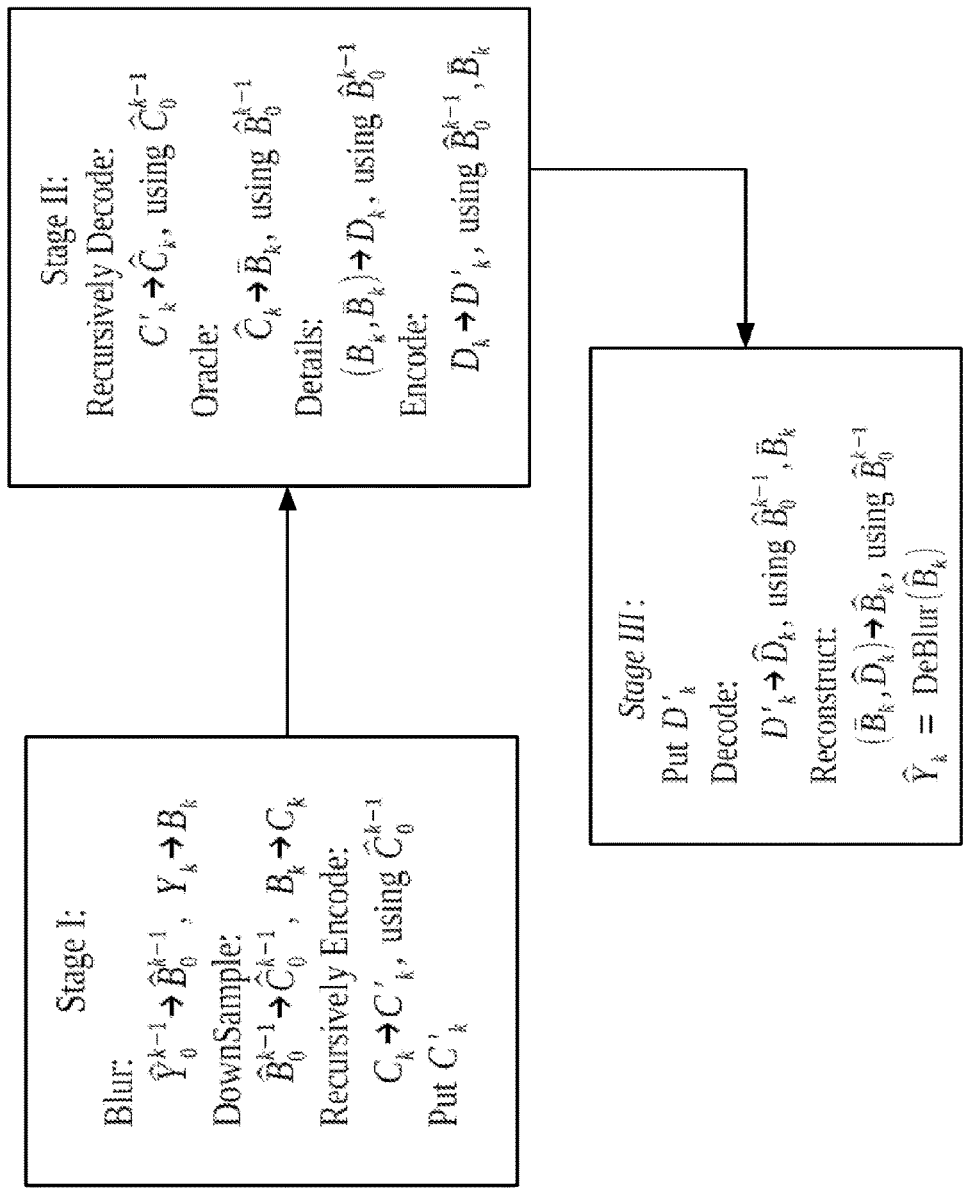
FIG. 13 is a diagram of a Specific No Latency Encoder Raise Algorithm.
Figure 14:
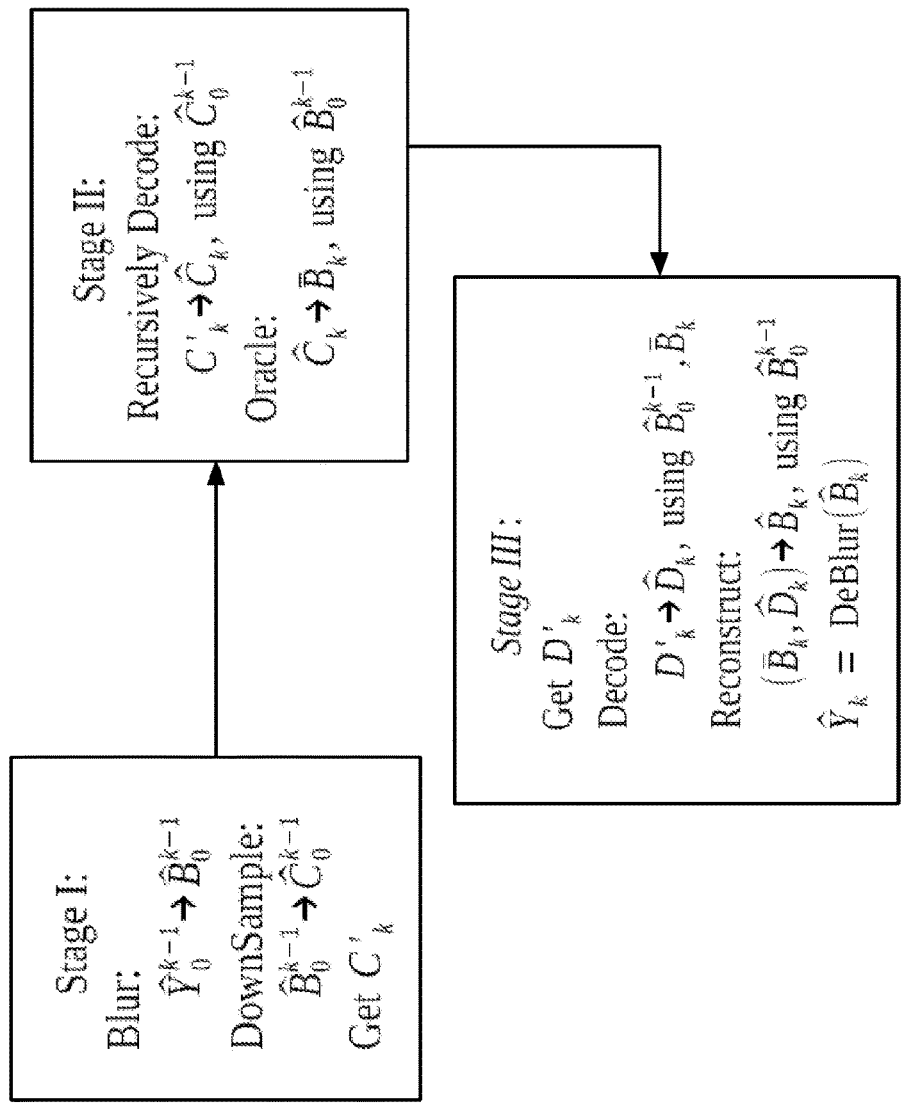
FIG. 14 is a diagram of a Specific No Latency Decoder Raise Algorithm.

Example 2: A Specific No Latency Raise Algorithm (FIGS. 13, 14)

In this section we describe one possible implementation of the No Latency Raise algorithm above. Note however, that many other implementations are possible.

In our example, the Oracle method predicts the frame $\overline{B}_k$ which is the completion of the sub-frame $\hat{C}_k$ to the spatial resolution of the whole frame $B_k$. More precisely, the pixels in $\overline{B}_k$ that correspond to the down sampled sub-frame $\hat{C}_k$, are exactly those of $\hat{C}_k$. Then, the other pixels in $\overline{B}_k$ are predicted from those of $\hat{C}_k$, and the previously decoded blurred frames $\hat{B}_0^{k-1}$. We call the missing pixels the new pixels. In our example, we further assume for simplicity, that $\hat{C}_k$ correspond to the even-quincunx sub-lattice as in Example 1 above.

Spatial Prediction

In spatial prediction, we predict the new pixels in $\overline{B}_k$ using the pixels in $\hat{C}_k$. This can be done using the methods described in Example 1 above. We denote this completed whole frame by $\overline{B}_k^s$, with pixels values denoted as $\overline{b}_{i,j,k}^s$. Note that the pixel values corresponding to the sub-lattice $\hat{C}_k$ remain unchanged.

Temporal Prediction

In temporal prediction, we predict the new pixels in $\overline{B}_k$ using the previously decoded frames $\hat{B}_0^{k-1}$. In what follows we describe a simple block matching algorithm for that purpose. Note however, that many other implementations are possible.
Block Construction Given a new pixel $\overline{b}_{i,j,k}$ meaning a new pixel at row i and column j of $\overline{B}_k$, construct a block $\overline{B}_{i,j,k}$ consisting of the surrounding nearest neighboring known pixels. For the example above, a block can consists of just the top, right, bottom, and left nearest neighbors of the new pixel. To complete the construction we subtract the average $a_{i,j,k}$ of the block's pixels from each pixel in the block. We consider similarly, blocks $\hat{B}_{m,n,l}$ in the previously decoded blurred frames $\hat{B}_0^{k-1}$. Here $\hat{B}_{m,n,l}$ denote the block at row m and column n of frame $\hat{B}_l$ which is the l=0, . . . , k-1 frame in $\hat{B}_0^{k-1}$. Note that as above, we also subtract the average of this block's pixels from each pixel in this block.
Block Matching Given a block $\overline{B}_{i,j,k}$ find the closest block in the previous frames $\hat{B}_l$ for l=0, . . . , k-1. For example, we can find the closest $\hat{B}_{m,n,l}$ block in the sense of the sum of max absolute difference, see Ref [4].
Prediction Let $\hat{B}_{m,n,l}$ denote the corresponding matched block of $\overline{B}_{i,j,k}$.

Let $\hat{b}_{m,n,l}$ be the pixel in $\hat{B}_{m,n,l}$ corresponding to pixel $\overline{b}_{i,j,k}$ in $\overline{B}_{i,j,k}$.

Then $\overline{b}_{i,j,k}^t = \hat{b}_{m,n,l} + a_{i,j,k}$, where $a_{i,j,k}$ is the respective average computed above, is the temporal prediction of the new pixel at row i and column j of $\overline{B}_k$.

The Low Latency Oracle Prediction Method

For each new pixel at row i and column j of $\overline{B}_k$, we consider both the corresponding spatial prediction value $\overline{b}_{i,j,k}^s$ and the corresponding temporal prediction value $\overline{b}_{i,j,k}^t$. We then choose the best one of them, namely, the temporal prediction if the corresponding blocks' difference is below some threshold, or the spatial prediction otherwise. To complete the description of the algorithm, we note that we determine the details $\hat{D}_k$ from $B_k$ and $\overline{B}_k$ using $\hat{B}_0^{k-1}$. Then, we reconstruct $\hat{B}_k$ from $\hat{D}_k$ and $\overline{B}_k$ using $\hat{B}_0^{k-1}$. Finally we recover the original image $\hat{Y}_k$ by de-blurring the decoded blurred frame $\hat{B}_k$.

Use Case: THE MULTI FRAME VIDEO CODEC

In the multi frame video codec the video frames are processed in blocks, for example, blocks corresponding to the respective cuts of the video, see Pat [1]. We then process each such block of frames independently and in parallel. In this section, we therefore consider the video to be simply that corresponding block of frames. The multi frame video codec is useful for applications that do not require real-time interaction such as Video On Demand(VOD) and DVD.

Figure 15:
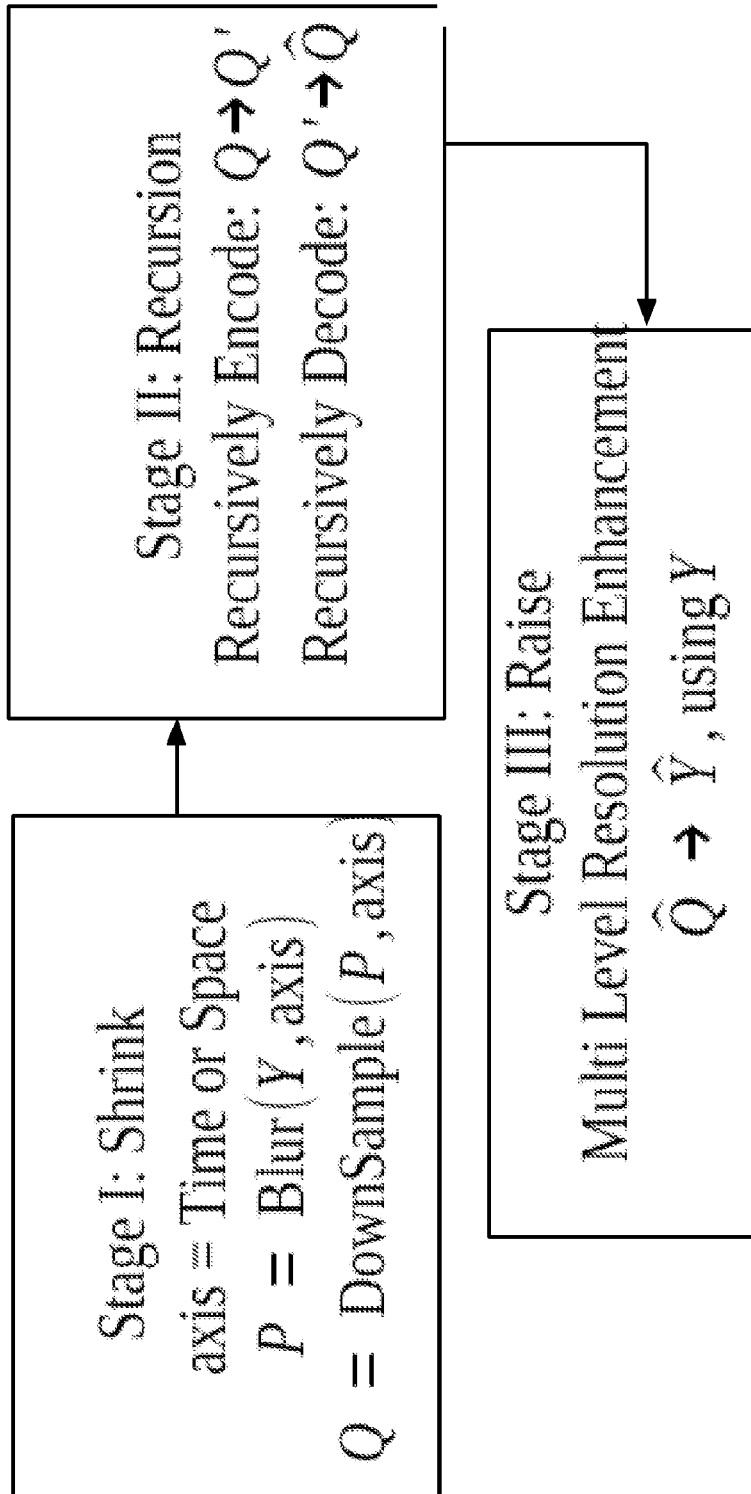
FIG. 15 is a diagram of the Multi Frame Video Codec.

The multi frame video codec, see FIG. 15, consists of the following stages:

Stage I: The Shrink Operation

Let us denote by Y the input video, and choose an axis, space or time. Then we blur Y along the corresponding axis direction and denote the blurred video as P. We then accordingly down sample P to get Q. For example, if the axis is temporal, down sampling may be the act of removing every other frame of the video, see FIG. 2. Similarly, if the axis is spatial, down sampling may be the act of removing the odd Quincunx sub-lattice from every frame, see FIG. 1.

Stage II: The Encode/Decode Operation

We recursively encode Q to get Q', and then recursively decode Q' into Q. See Pat. 1 for more details.

Stage III: The Raise Operation

The Raise algorithm is the multi level resolution increase of Q to the resolution of the input video Y.

In this section, we describe the Raise algorithm for the multi frame video codec. After reviewing the main stages of the Raise Algorithm, we proceed to describe some specific Raise implementations.

Figure 16:
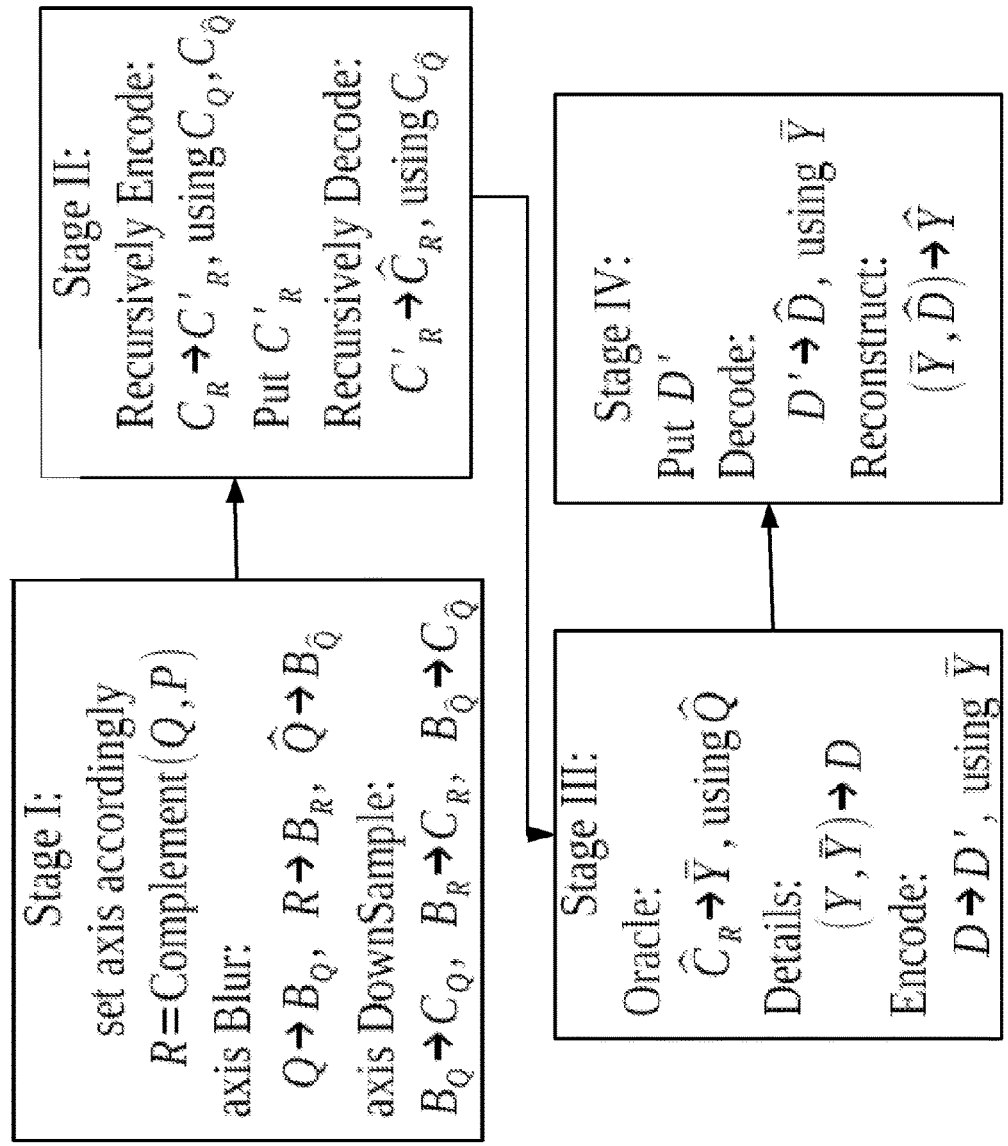
FIG. 16 is a diagram of the Multi Frame Encoder Raise Algorithm.

The Multi Frame Encoder Raise Algorithm (FIG. 16)

Stage I

Step 1: Set the axis direction to be the complement to the respective Shrink axis direction. Namely, if the respective Shrink axis was Space, then axis is Time and vice versa.

Step 2: Let R denotes the complement of Q in P, see FIG. 15. For example, if down sampling was the act of removing every other frame of the video, then R is that every other removed frame from P. Similarly, if down sampling was the act of removing the odd Quincunx sub-lattice from every frame, then R is that odd Quincunx sub-lattice of each and every frame.

Step 3: We accordingly apply blur filters to Q to get $B_Q$, to R to get $B_R$, and to Q to get $B_{\tilde{Q}}$. Note that if the axis is space we apply two-dimensional blur filters to each frame, and if the axis is time we apply one dimensional blur filters along the frames' direction.

Step 4: We accordingly down sample $B_Q$ to get $C_Q$, to $B_R$ to get $C_R$, and to $B_{\hat{Q}}$ to get $C_{\hat{Q}}$. Note that if the axis is space we spatially down sample each frame, for example, removing the odd Quincunx sub-lattice in each frame, see FIG. 1. unit 110. Similarly, if the axis is time we temporally down sample the frames, for example by removing every other frame, see FIG. 2.

Stage II

Step 1: We apply the current multi frame Encoder Raise algorithm recursively to the blurred and down sampled sub-video $C_R$ using $C_Q$, and $C_{\hat{Q}}$, and denote the result as $C'_R$. At the lowest level, we reach sub-videos $X_R$, $X_Q$ and $X_{\hat{Q}}$ of lowest respective resolution. We then encode $X_R$ directly using existing video compression method as described in Ref [2]. Alternatively, we can apply the following algorithm:
  Predict $X_R$ from $X_{\hat{Q}}$ and denote the predicted video by $\overline{X}_R$. This can be done using known frame interpolation methods, see for example Ref [4].
  Determine the additional details $\tilde{X}_R$ needed to recover $X_R$. For example this could be the difference $\tilde{X}_R = X_R - \overline{X}_R$.
  Encode $\tilde{X}_R$ using existing video compression methods, see Ref [2] and Pat [3].
  We denote the resulting encoded details by $\tilde{X}'_R$.

The lowest level by which we end the recursion can be determined in advance or dynamically using rate distortion techniques such as described in Ref [3].

Step 2: Put the encoded video $C'_R$ on the Bit Stream.

Step 3: Recursively decode $C'_R$ into $\hat{C}_R$, using $C_{\hat{Q}}$, see Step 1 above.

Stage III

Step 1: Predict the original Y from $\hat{C}_R$ and $\hat{Q}$ using an Oracle method, and denote the resulting video as $\overline{Y}$. For the Oracle method see the detailed description of the invention above.

Step 2: Determine the additional details D needed for recovering a good presentation of the original video from Y and $\overline{Y}$. For example, the details can be the difference between the original video Y and the predicted one $\overline{Y}$.

Step 3: Encode the details D using $\overline{Y}$ and denote the result by D'. Here, we use existing video compression methods, see Ref [2], Pat [2], and Pat [3].

Stage IV

Step 1: Put the encoded data D' on the Bit Stream.

Step 2: Decode $\hat{D}$ from D' using $\overline{Y}$, see Step 4 of Stage III above.

Step 3: Reconstruct $\hat{Y}$ from $\overline{Y}$, and $\hat{D}$. For example, if the details were the difference as in Step 3 of Stage III above, then we reconstruct by adding $\hat{D}$ to $\overline{Y}$.

The Multi Frame Video Bit Stream

The Bit Stream consists of the encoded sub-video $C'_R$, and the details D'. Since $C'_R$ is recursively computed, $C'_R$ itself consists of a very low resolution encoded sub-video and the sequence of the corresponding details.

Figure 17:
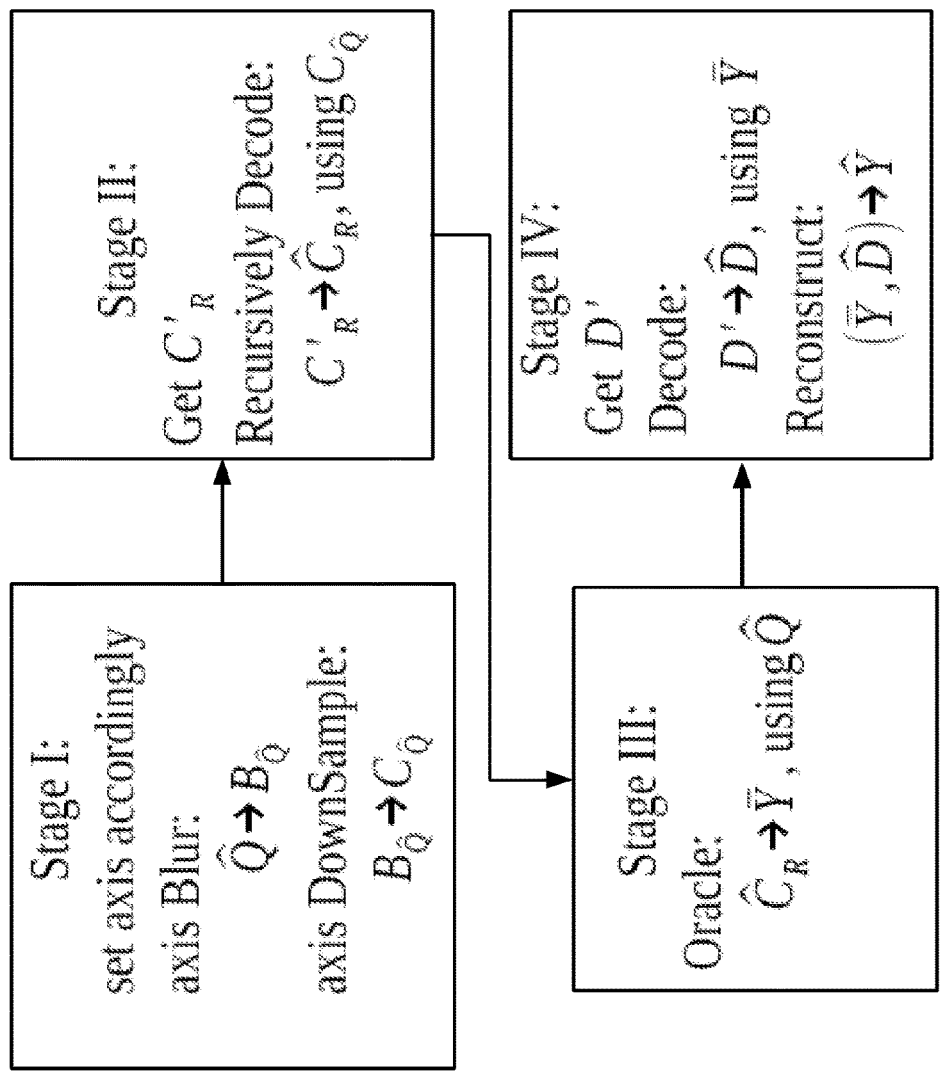
FIG. 17 is a diagram of the Multi Frame Decoder Raise Algorithm.

The Multi Frame Decoder Raise Algorithm (FIG. 17)

Stage I

Step 1: Set the axis direction accordingly, see Step 1 of Stage I of the Encoder.

Step 2: Accordingly, see Step 3 of Stage I of the Encoder, we apply blur filters to $\hat{Q}$ to get $B_{\hat{Q}}$.

Step 3: Accordingly, see Step 4 of Stage I of the Encoder, we down sample $B_{\hat{Q}}$ to get $C_{\hat{Q}}$.

Stage II

Step 1: Get the encoded data $C'_R$ on the Bit Stream.

Step 2: Recursively decode $C'_R$ into $\hat{C}_R$, using $C_{\hat{Q}}$, see the corresponding step 3 of Stage II of the Encoder.

Stage III

Step 1: Predict the original video Y from $\hat{C}_R$ and $\hat{Q}$ using an Oracle method, and denote the resulting video as $\overline{Y}$. Note that this is the same Oracle method as in Step 1 of Stage III of the Encoder above.

Stage IV

Step 1: Get the encoded data D' from the Bit Stream.

Step 2: Decode $\hat{D}$ from D' using $\overline{Y}$, see Step 2 of Stage IV of the Encoder above.

Step 3: Reconstruct $\hat{Y}$ from $\overline{Y}$, and $\hat{D}$, see Step 3 of Stage IV of the Encoder above.

Figure 18:
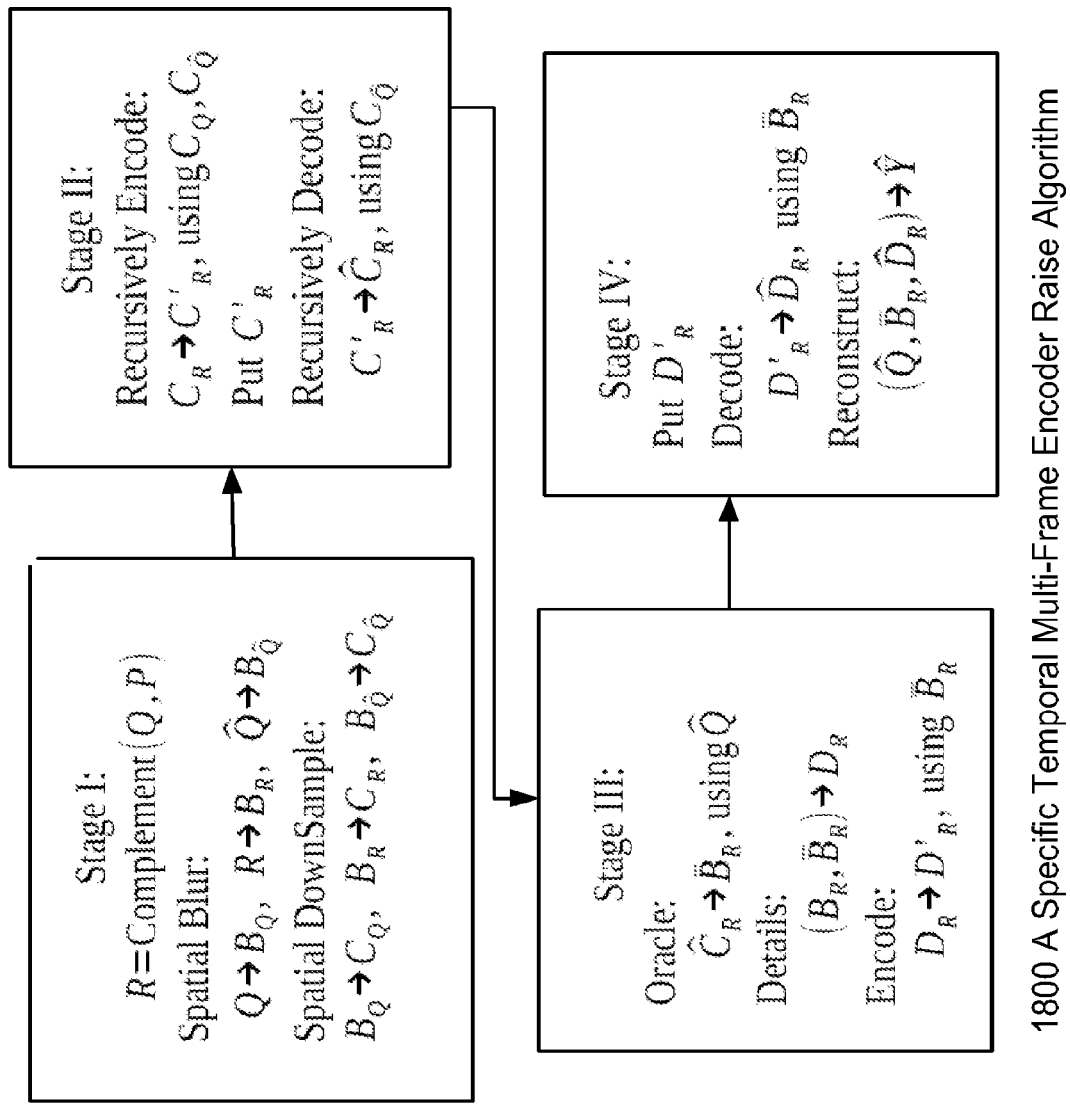
FIG. 18 is a diagram of a Specific Temporal Multi Frame Encoder Raise Algorithm.
Figure 19:
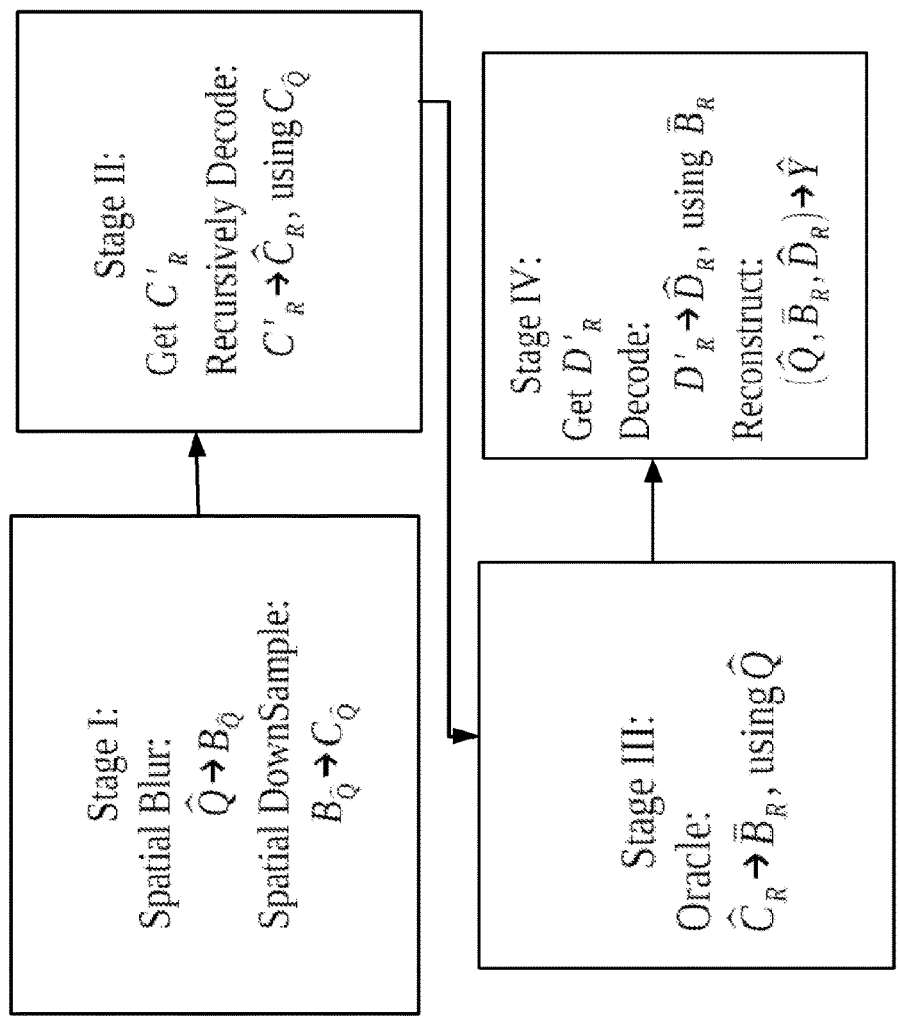
FIG. 19 is a diagram of a Specific Temporal Multi Frame Decoder Raise Algorithm.

Example 3: A Specific Temporal Multi Frame Raise Algorithm (FIGS. 18, 19.)

In this section we describe one possible implementation of the temporal multi frame Raise algorithm above. Note however, that many other implementations are possible.

In our example, the Oracle method predicts the sub-video $\overline{B}_R$ which is the completion of the sub-video $\hat{C}_R$, to the spatial resolution of the whole video $B_R$. More precisely, the pixels in $\overline{B}_R$ that correspond to the down sampled sub-video $\hat{C}_R$, are exactly those of $\hat{C}_R$. Then, the other pixels in $\overline{B}_R$ are predicted from those of $\hat{C}_R$, and the previously decoded blurred frames $\hat{Q}$. We call the missing pixels the new pixels. In our example, we further assume for simplicity that $\hat{C}_R$ correspond to the even-quincunx sub-lattices as in Example 2 above.

Spatial Prediction

In spatial prediction, we predict the new pixels in a given frame of $\overline{B}_R$ using the pixels in the respective sub-frame of $\hat{C}_R$. This can be done using the methods described in Example 2 above.

Temporal Prediction

In temporal prediction, we predict the new pixels in a given frame of $\overline{B}_R$ using the previously decoded frames of $\hat{Q}$. This is similar to what was done in Example 2 above.

However, now we obtain better prediction, since in $\hat{Q}$ we have both past and future(in time) frames with respect to the predicted frame of $B_R$.

The Multi-Frame Oracle Method

As in Example 2 above, the Oracle prediction is the best prediction among the spatial and temporal predictions. To complete the description of the algorithm, we note that we determine the details $D_R$ from $B_R$ and $\overline{B}_R$ using $\hat{Q}$. Then, we reconstruct $\hat{B}_R$ from $\hat{D}_k$ and $\overline{B}_R$ using $\hat{Q}$. Finally we recover the original image f by de-blurring the decoded blurred frame $\hat{B}_R$.

Figure 20:
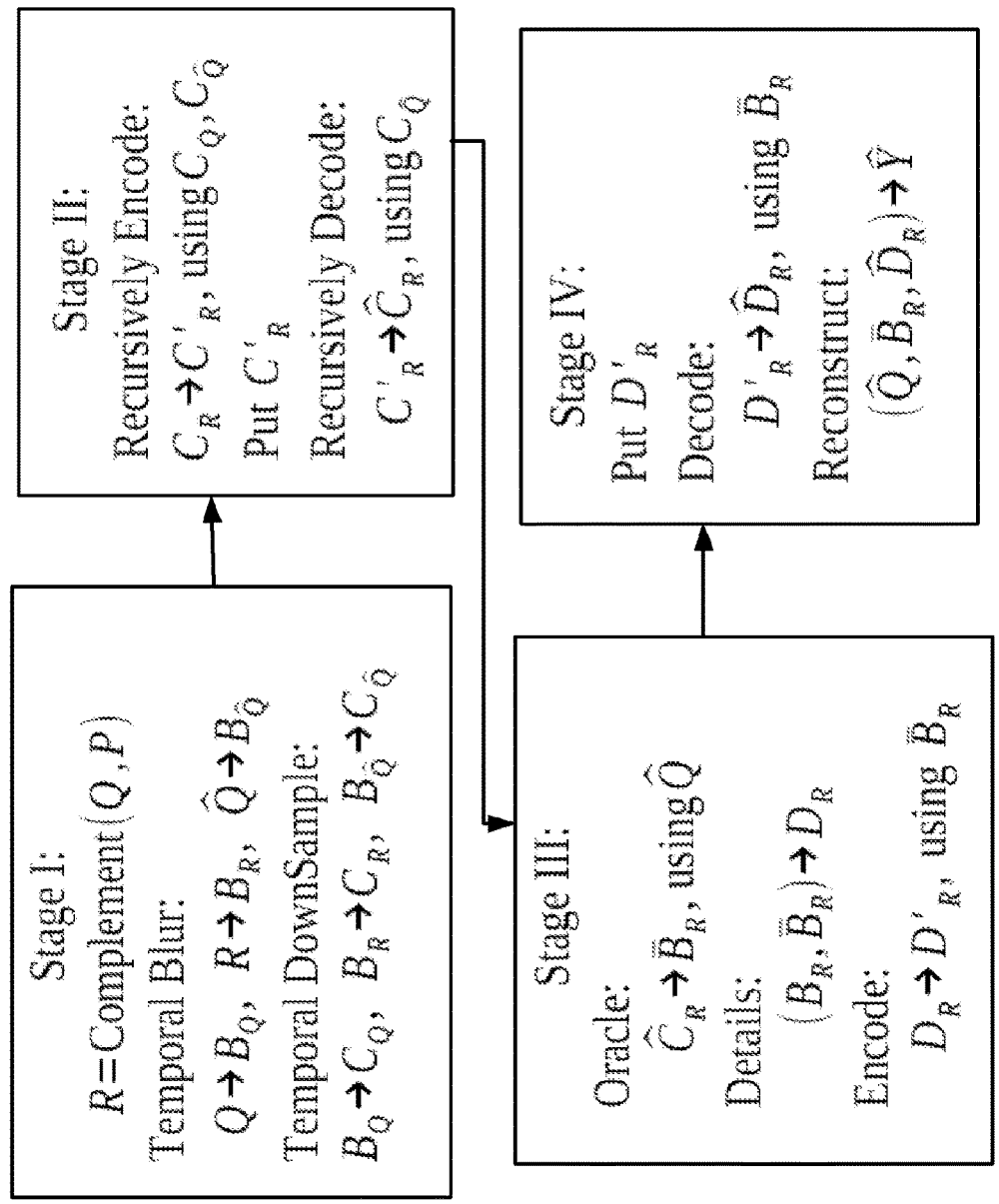
FIG. 20 is a diagram of a Specific Spatial Multi Frame Encoder Raise Algorithm.
Figure 21:
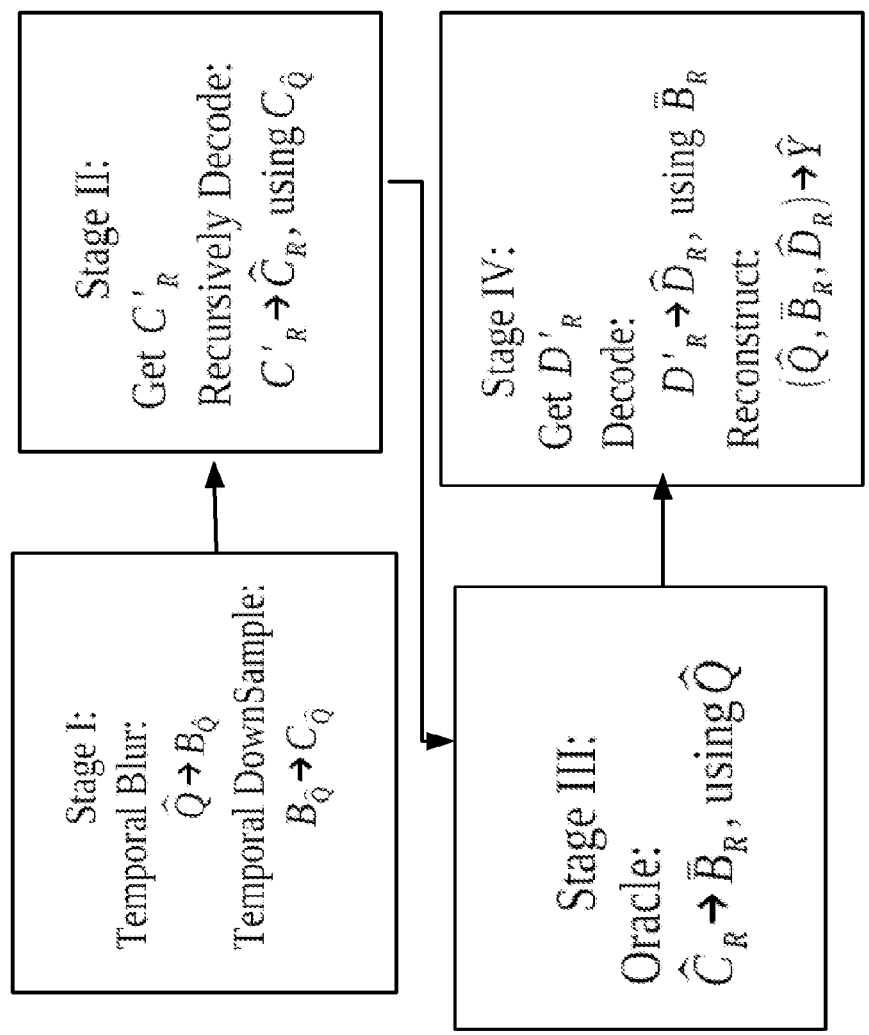
FIG. 21 is a diagram of a Specific Spatial Multi Frame Decoder Raise Algorithm.

Example 4: A Specific Spatial Multi Frame Raise Algorithm (FIGS. 20, 21.)
In this section we describe one possible implementation of the spatial multi frame Raise algorithm above. This is very similar to Example 3, only that now the roles of spatial and temporal operations get interchanged. Note however, that many other implementations are possible.

In our example, the Oracle method predicts the sub-video $\hat{B}_R$ which is the completion of the sub-video $\hat{C}_R$, to the temporal resolution of the whole video $B_R$. More precisely, the pixels in $\overline{B}_R$ that correspond to the down sampled sub-video $\hat{C}_R$, are exactly those of $\hat{C}_R$. Then, the other pixels in $\hat{B}_R$ are predicted from those of $\hat{C}_R$, and the previously decoded blurred frames $\hat{Q}$. We call the missing pixels the new pixels. In our example, we further assume for simplicity that, $\hat{C}_R$ correspond to the every other frame in the video.

Spatial Prediction

This is the same as in Example 3 above.

Temporal Prediction

This is the same as in Example 3 above.

The Multi-Frame Oracle Method

As in Example 3 above, the Oracle prediction is the best prediction among the spatial and temporal predictions. To complete the description of the algorithm, we note that we determine the details $D_R$ from $B_R$ and $\overline{B}_R$ using $\hat{Q}$. Then, we reconstruct $\hat{B}_R$ from $\hat{D}_k$ and $\overline{B}_R$ using $\hat{Q}$. Finally we recover the original image $\hat{Y}$ by de-blurring the decoded blurred frame $\hat{B}_R$.

The following documents are referenced in the application and are all incorporated by reference herein:

PATENTS

Pat [1] Ilan Bar-On and Oleg Kostenko,
  A New Algorithm for Video Compression,
  Pub. No. WO/2014/053982.
Pat [2] Ilan Bar-On,
  Method and Apparatus for a Multidimensional Discrete Multiwavelet Transform, U.S. Pat. No. 8,331,708 B2, Dec. 11, 2012.
Pat [3] Ilan Bar-On and Oleg Kostenko,
  A Method and a System for Wavelet Based Processing, Pub. No. WO/2008/081459.

REFERENCES

Ref [1] "Multiwavelets in $R^n$ with an Arbitrary Dilation Matrix", C. Cabrelli, C. Heil, and U. Molter, in L. Debnath, Wavelets and Signal Processing, 2002
Ref [2] "Introduction to Data Compression", Khalid Sayood, Second Edition, 2000
Ref [3] "Rate-distortion_optimization", http://en.wikipedia.org/wiki/Rate-distortion_optimization
Ref [4] "Computer Vision: Algorithms and Applications", Richard Szeliski, 2010.
Ref [5] "Computer Vision: A Modern Approach", David A. Forsyth, Jean Ponce, 2011.

The invention claimed is:

1. A method of video compression comprising:
  a. providing an original video having a given spatial resolution;
  b. compressing a first frame of said original video using any image compression method; and
  c. repeatedly compressing a next frame of said original video using the steps of:
    i. providing a current video comprising the already compressed video frames, said current video having an initial spatial resolution;
    ii. repeatedly reducing the spatial resolution of said current video and the spatial resolution of said next frame of the original video, to produce a lowest level spatial resolution current video and a lowest level spatial resolution next frame of the original video;
    iii. compressing said lowest level spatial resolution next frame of the original video to produce a lowest level compressed next frame, using the steps of:
      (1) Oracle prediction of said lowest level spatial resolution next frame of the original video, using temporal and/or spatial information of said lowest level spatial resolution current video and said next frame; and
      (2) calculating enhancement data and using said calculated enhancement data to enhance said prediction;
    iv. compressing a higher-level spatial resolution of said next frame of the original video frame to produce a higher-level compressed next frame, using the steps of:
      (3) Oracle prediction of said higher level spatial resolution next frame of the original video, using temporal and/or spatial information of said higher-level spatial resolution current video and said lower-level compressed next frame; and
      (4) calculating enhancement data and using said calculated enhancement data to enhance said prediction; and
    v. repeating step (iv) up to the initial spatial resolution of said current video.

2. The method of claim 1, further comprising, before reducing in step c.ii, blurring said current video and said next frame.

3. The method of claim 1, wherein said Oracle prediction operations in step c.iii(1) comprise analyzing the temporal motion field and the spatial geometrical structure of said current video and said next frame.

4. The method of claim 1, wherein said Oracle prediction operations in step c.iv(3) comprise analyzing the temporal motion field and the spatial geometrical structure of said higher-level spatial resolution current video and said lower-level compressed next frame.

5. The method of claim 1 wherein said calculating enhancement data in steps c.iii(2) and c.iv(4) comprise analyzing the temporal motion field and the spatial geometrical structure of said current video and said next frame.

6. The method of claim 1, wherein:
I. said operations on the original video are performed in an encoder;
II. said oracle prediction operations are performed in a decoder and simulated at the encoder;
III. said calculating enhancement data is performed in the encoder;
IV. said enhancement data is provided from said encoder to a decoder;
V. said using the enhancement data is performed in both the encoder and the decoder.

7. The method of claim 6, wherein said calculating enhancement data comprises analyzing the temporal motion field and the spatial geometrical structure of said current video and said next frame.

8. The method of claim 6 further comprising, before reducing in step c.ii, blurring said current video and said next frame.

9. The method of claim 6, wherein said oracle prediction operations comprise analyzing the temporal motion field and the spatial geometrical structure of said current video and said next frame.

10. The method of claim 6, wherein the current video comprises one or more of the already compressed video frames.

11. The method of claim 1, wherein the current video comprises one or more of the already compressed video frames.

* * * * *